(12) United States Patent
Garcia-Martinez et al.

(10) Patent No.: US 8,206,498 B2
(45) Date of Patent: Jun. 26, 2012

(54) METHODS OF RECOVERY OF PORE-FORMING AGENTS FOR MESOSTRUCTURED MATERIALS

(75) Inventors: Javier Garcia-Martinez, Alicante (ES); Marvin M. Johnson, Bartlesville, OK (US)

(73) Assignee: Rive Technology, Inc., Cambridge, MA (US)

( * ) Notice: Subject to any disclaimer, the term of this patent is extended or adjusted under 35 U.S.C. 154(b) by 955 days.

(21) Appl. No.: 12/009,894

(22) Filed: Jan. 23, 2008

(65) Prior Publication Data

US 2009/0110631 A1  Apr. 30, 2009

(51) Int. Cl.
*C01B 37/00* (2006.01)
*C01B 39/04* (2006.01)

(52) U.S. Cl. .......................... 106/122; 423/702
(58) Field of Classification Search .................. 423/702; 106/122

See application file for complete search history.

(56) References Cited

U.S. PATENT DOCUMENTS

| | | | |
|---|---|---|---|
| 3,709,853 A | 1/1973 | Karapinka | |
| 3,864,280 A | 2/1975 | Schneider | |
| 4,016,218 A | 4/1977 | Haag et al. | |
| 4,088,671 A | 5/1978 | Kobylinski | |
| 4,196,182 A | 4/1980 | Willermet et al. | |
| 4,205,055 A | 5/1980 | Maire et al. | |
| 4,263,268 A | 4/1981 | Knox et al. | |
| 4,318,824 A | 3/1982 | Turner | |
| 4,439,349 A | 3/1984 | Everett et al. | |
| 4,564,207 A | 1/1986 | Russ et al. | |
| 4,609,972 A | 9/1986 | Edeling et al. | |
| 4,637,623 A | 1/1987 | Bubik | |
| 4,689,314 A | 8/1987 | Martinez et al. | |
| 4,704,375 A | 11/1987 | Martinez et al. | |
| 4,761,272 A | 8/1988 | Hucke | |
| 4,775,655 A | 10/1988 | Edwards et al. | |
| 4,806,689 A | 2/1989 | Gier et al. | |
| 4,816,135 A | 3/1989 | Martinez et al. | |
| 4,836,737 A | 6/1989 | Holmes et al. | |
| 4,857,494 A | 8/1989 | Martinez et al. | |
| 4,891,458 A | 1/1990 | Innes et al. | |
| 4,894,215 A | 1/1990 | Kawakubo et al. | |
| 4,894,354 A | 1/1990 | Martinez et al. | |
| 4,968,405 A | 11/1990 | Wachter | |
| 5,013,699 A | 5/1991 | Vassilakis et al. | |
| 5,051,385 A | 9/1991 | Wachter | |
| 5,057,296 A | 10/1991 | Beck | |
| 5,061,147 A | 10/1991 | Nespor | |

(Continued)

FOREIGN PATENT DOCUMENTS

WO     2005102964     11/2005

(Continued)

OTHER PUBLICATIONS

Moller et al, Synthesis of Ordered Mesoporous . . . , Chem. Mater, (Feb. 1999) pp. 665-673.*

(Continued)

*Primary Examiner* — David M Brunsman
(74) *Attorney, Agent, or Firm* — Hovey Williams LLP

(57) ABSTRACT

The invention provides methods of recovering a pore-forming agent from an inorganic material that defines a plurality of mesopores having a controlled cross sectional area to form a mesostructure having long-range crystallinity and also to methods of making one or more mesostructures that features removal, recovery, and/or reuse of the pore-forming agent. Suitable pore-forming agents include, for example, surfactants.

23 Claims, 7 Drawing Sheets

U.S. PATENT DOCUMENTS

| | | | |
|---|---|---|---|
| 5,095,169 A | 3/1992 | Skeels et al. |
| 5,102,643 A | 4/1992 | Kresge et al. |
| 5,116,794 A | 5/1992 | Skeels et al. |
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rosi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,391,433 A | 2/1995 | Kawakubo et al. |
| 5,393,718 A | 2/1995 | Skeels et al. |
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A | 2/1997 | Cooper et al. |
| 5,614,453 A | 3/1997 | Occelli |
| 5,628,978 A | 5/1997 | Tejada et al. |
| 5,636,437 A | 6/1997 | Kaschmitter et al. |
| 5,659,099 A | 8/1997 | Skeels et al. |
| 5,662,965 A | 9/1997 | Duguchi et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,800,801 A | 9/1998 | Tejada |
| 5,840,264 A | 11/1998 | Pinnavaia et al. |
| 5,840,271 A | 11/1998 | Carrazza et al. |
| 5,849,258 A | 12/1998 | Lujano et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,902,564 A | 5/1999 | Lujano et al. |
| 5,952,257 A | 9/1999 | Tejada et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A | 1/2000 | Shukis et al. |
| 6,022,471 A | 2/2000 | Wachter et al. |
| 6,024,899 A | 2/2000 | Peng et al. |
| 6,027,706 A | 2/2000 | Pinavaia et al. |
| 6,087,044 A | 7/2000 | Iwase et al. |
| 6,096,828 A | 8/2000 | DePorter et al. |
| 6,106,802 A | 8/2000 | Lujano et al. |
| 6,139,721 A | 10/2000 | Baldiraghi et al. |
| 6,162,414 A | 12/2000 | Pinnavaia et al. |
| 6,193,943 B1 | 2/2001 | Pinnavaia et al. |
| 6,204,424 B1 | 3/2001 | Yadav et al. |
| 6,248,691 B1 | 6/2001 | Gadkaree et al. |
| 6,297,293 B1 | 10/2001 | Bell et al. |
| 6,299,855 B1 | 10/2001 | Lujano et al. |
| 6,319,872 B1 | 11/2001 | Manzer et al. |
| 6,334,988 B1 | 1/2002 | Gallis et al. |
| 6,391,278 B1 | 5/2002 | Pinnavaia et al. |
| 6,410,473 B1 | 6/2002 | Pinnavaia et al. |
| 6,413,489 B1 | 7/2002 | Ying et al. |
| 6,413,902 B1 | 7/2002 | Pinnavaia et al. |
| 6,419,820 B1 | 7/2002 | Bogdan et al. |
| 6,476,085 B2 | 11/2002 | Manzer et al. |
| 6,476,275 B2 | 11/2002 | Schmidt et al. |
| 6,485,702 B1 | 11/2002 | Lujano et al. |
| 6,489,168 B1 | 12/2002 | Wang et al. |
| 6,495,487 B1 | 12/2002 | Bogdan |
| 6,515,845 B1 | 2/2003 | Oh et al. |
| 6,524,470 B1 | 2/2003 | Kasztelan et al. |
| 6,538,169 B1 | 3/2003 | Pittman et al. |
| 6,541,539 B1 | 4/2003 | Yang et al. |
| 6,544,923 B1 | 4/2003 | Ying et al. |
| 6,548,440 B1 | 4/2003 | Pham et al. |
| 6,558,647 B2 | 5/2003 | Lacombe et al. |
| 6,580,003 B2 | 6/2003 | Deng et al. |
| 6,583,186 B2 | 6/2003 | Moore, Jr. |
| 6,585,948 B1 | 7/2003 | Ryoo |
| 6,585,952 B1 | 7/2003 | Pinnavaia et al. |
| 6,592,764 B1 | 7/2003 | Stucky et al. |
| 6,620,402 B2 | 9/2003 | Jacobsen et al. |
| 6,623,967 B1 | 9/2003 | Willson, III |
| 6,649,413 B1 | 11/2003 | Schultz et al. |
| 6,656,443 B2 | 12/2003 | Klett |
| 6,669,924 B1 | 12/2003 | Kaliaguine et al. |
| 6,689,336 B2 | 2/2004 | Kanno |
| 6,702,993 B2 | 3/2004 | Pinnavaia et al. |
| 6,706,169 B2 | 3/2004 | Pinnavaia et al. |
| 6,706,659 B2 | 3/2004 | Gillespie et al. |
| 6,710,003 B2 | 3/2004 | Jan et al. |
| 6,746,659 B2 | 6/2004 | Pinnavaia et al. |
| 6,756,515 B2 | 6/2004 | Rende et al. |
| 6,762,143 B2 | 7/2004 | Shan et al. |
| 6,770,258 B2 | 8/2004 | Pinnavaia et al. |
| 6,793,911 B2 | 9/2004 | Koegler et al. |
| 6,797,153 B1 | 9/2004 | Fukuyama et al. |
| 6,797,155 B1 | 9/2004 | Chester et al. |
| 6,800,266 B2 | 10/2004 | Pinnavaia et al. |
| 6,809,061 B2 | 10/2004 | Bogdan et al. |
| 6,811,684 B2 | 11/2004 | Mohr et al. |
| 6,814,943 B2 | 11/2004 | Radcliffe et al. |
| 6,818,589 B1 | 11/2004 | Gillespie |
| 6,833,012 B2 | 12/2004 | Rogers |
| 6,841,143 B2 | 1/2005 | Inagaki et al. |
| 6,843,906 B1 | 1/2005 | Eng |
| 6,843,977 B2 | 1/2005 | Pinnavaia et al. |
| 6,846,546 B2 | 1/2005 | Kuroda et al. |
| 6,866,925 B1 | 3/2005 | Chane-Ching |
| 6,869,906 B2 | 3/2005 | Pinnavaia et al. |
| 6,936,234 B2 | 8/2005 | Bilenko |
| 6,998,104 B2 | 2/2006 | Tao et al. |
| 7,084,087 B2 | 8/2006 | Shan et al. |
| 7,589,041 B2 | 9/2009 | Ying et al. |
| 7,807,132 B2 | 10/2010 | Garcia-Martinez |
| 7,976,696 B2 | 7/2011 | Ying et al. |
| 8,007,663 B2 | 8/2011 | Ying et al. |
| 8,008,223 B2 | 8/2011 | Garcia-Martinez |
| 2001/0031241 A1 | 10/2001 | Lacombe et al. |
| 2003/0054954 A1 | 3/2003 | Chane-Ching et al. |
| 2004/0067842 A1 | 4/2004 | Pinnavaia et al. |
| 2004/0138051 A1 | 7/2004 | Shan et al. |
| 2004/0179996 A1 | 9/2004 | Shan et al. |
| 2005/0130827 A1 | 6/2005 | Schunk et al. |
| 2005/0214539 A1 | 9/2005 | Ying et al. |
| 2007/0244347 A1 | 10/2007 | Ying et al. |
| 2010/0190632 A1 | 7/2010 | Dight |
| 2010/0196263 A1 | 8/2010 | Garcia-Martinez |
| 2011/0118107 A1 | 5/2011 | Garcia-Martinez |
| 2011/0171121 A1 | 7/2011 | Senderov |

FOREIGN PATENT DOCUMENTS

| | | |
|---|---|---|
| WO | 2006/031259 | 3/2006 |
| WO | 2006031259 | 3/2006 |
| WO | 2006/038912 | 4/2006 |

OTHER PUBLICATIONS van Grieken et al, "Supercritical Fluid Extraction of a Nonionic Surfactant . . .", Langmuir (Mar. 2003) pp. 3966-3973.*
Mendes et al, "Optimization or the Process of Concentration . . .", Brazilian Journal of Chemical Engineering, (2005), pp. 83-91.*
Grudzien et al, "Effective method for removal of polymeric template . . .", Mater. Chem. (2006), pp. 819-823.*
Patarin, "Mild Methods for Removing Organic Templates from Inorganic Host Materials", Angew. Chem. Int. Ed., 2004, pp. 3878-3880.*
Al-Khattaf, S. et al., "The Role of Diffusion in Alkyl-Benzenes Catalytic Cracking," *Appl. Catal. A: Gen.*, 226:139-153 (2002).
Bagri, R. et al., "Catalytic Pyrolysis of Polyethylene," *J. Anal. and Applied Pyrolysis*, 63:29-41 (2002).
Corma, A., "From Microporous to Mesoporous Molecular Sieve Materials and Their Use in Catalysis," *Chem. Rev.*, 97:2373-2419 (1997).
"CSIC NM014-Method of Preparation of Mesoporous Alumina with High Thermal Stability," http://www.serina.es/escaparate/verproducto.cgi?idproducto=4980&refcompra=NULO, downloaded May 9, 2007, 2 pgs.
Davis, M.E., "Ordered Porous Materials for Emerging Applications," *Nature*, 417:813-821 (2002).
Davis, M.E., "Zeolite and Molecular Sieve Synthesis," *Chem. Mater.*, 4:756-768 (1992).
de Moor, P-P.E.A. et al., "Imaging the Assembly Process of the Organic-Mediated Synthesis of a Zeolite," *Chem. Eur. J.*, 5(7):2083-2088 (1999).
Degnan, T.F. et al., "History of ZSM-5 Fluid Catalytic Cracking Additive Development at Mobil," *Microporous and Mesoporous Mater.*, 35-36:245-252 (2000).
de A.A. Soler-Illia, Galo, J. et al., "Chemical Strategies to Design Textured Materials from Microporous and Mesoporous Oxides to Nanonetworks and Hierarchical Structures," *Chem. Rev.*, 102:4093-4138 (2002).
Geidel, E. et al., "Characterization of Mesoporous Materials by Vibrational Spectroscopic Techniques," *Microporous and Mesoporous Mater.*, 65:31-42 (2003).
González-Peña, V. et al., "Thermally Stable Mesoporous Alumina Synthesized with Non-ionic Surfaces in the Presence of Amines," *Microporous and Mesoporous Materials*, 44-45:203-210 (2001).
Harding, R.H. et al., "New Developments in FCC Catalyst Technology," *Appl. Catal. A:Gen.*, 221:389-396 (2001).
Huang, L. et al., "Investigation of Synthesizing MCM-41/ZSM-5 Composites," *J. Phys. Chem. B*. 104:2817-2823 (2000).
Karlsson, A. et al., "Composites of Micro- and Mesoporous Materials: Simultaneous Syntheses of MFI/MCM-41 Like Phases by a Mixed Template Approach," *Miscroporous and Mesoporous Mater.*, 27:181-192 (1999).
Kloestra, K.R. et al., "Mesoporous Material Containing Framework Tectosilicate by Pore-Wall Recrystallization," *Chem. Commun.*, 23:2281-2282 (1997).
Lee, H. et al., "Materials Science: On the Synthesis of Zeolites," *ScienceWeek*, downloaded from http://www.scienceweek.com/2003/sa031031-1.htm on Apr. 23, 2005, 5 pgs.
Linssen, T. et al., "Mesoporous Templated Silicates: An Overview of Their Synthesis, Catalytic Activation and Evaluation of the Stability," *Advances in Colloid and Interface Science*, 103:121-147 (2003).
Liu, Y. et al., "Steam-Stable MSU-S Aluminosilicate Mesostructures Assembled from Zeolite ZSM-5 and Zeolite Beta Seeds," *Angew. Chem. Int. Ed.*, 40(7):1255-1258 (2001).
Liu, Y. et al., "Aluminosilicate Mesostructures with Improved Acidity and Hydrothermal Stability," *J. Mater. Chem.*, 12:3179-3190 (2002).
Lyons, D.M. et al.,"Preparation of Ordered Mesoporous Ceria with Enhanced Thermal Stability," *J. Mater. Chem.*, 12:1207-1212 (2002).
On, D.T. et al., "Large-Pore Mesoporous Materials with Semi-Crystalline Zeolitic Frameworks," *Angew. Chem. Int. Ed.*, 40(17):3248-3251 (2001).
Park, D.W. et al., "Catalytic Degradation of Polyethylene Over Solid Acid Catalysts," *Polym. Degrad. Stabil.*, 65:193-198 (1999).
Scherzer, J., "Octane-Enhancing Zeolitic FCC Catalysts—Scientific and Technical Aspects," *Marcel Dekker, Inc.*, pp. 141-179 (1990).
Storck, S. et al., "Characterization of Micro- and Mesoporous Solids by Physisorption Methods and Pore-Size Analysis," *Applied Catalysts A: Gen.* 174:137-146 (1998).
Tao, Y. et al., "Mesopore-Modified Zeolites: Preparation, Characterization, and Applications," *Chem. Rev.*, 106:896-910 (2006).
Triantafyllidis, K.S. et al., "Gas-oil Cracking Activity of Hydrothermally Stable Aluminosilicate Mesostructures (MSU-S) Assembled from Zeolite Seeds: Effect of the Type of Framework Structure and Porosity," *Catalyst Today*, vol. 112:33-36 (2006).

Yang, P. et al., "Generalized Syntheses of Large-Pore Mesoporous Metal Oxides with Semicrystalline Frameworks," *Nature*, 396:152-155 (1998).
Ying, J.Y. et al., "Synthesis and Applications of Supramolecular-Templated Mesoporous Materials," *Angew. Chem. Int. Ed.*, 38:57-77 (1999).
Al-Khattaf, S. et al., The Role of Diffusion in Alkyl-Benzenes Catalytic Cracking, Appl. Catal. A: Gen. 226; 139-153, (2002).
Bagri, R. et al.; Catalytic Pyrolysis of Polyethylene; Anal. Pyrolysis, 63:29-41 (2002).
Conway, B.E., Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.
Corma, A., From Microporous to Mesoporous Molecular Sieve Materials and Their Use in Catalysis, Chem. Rev., 97:2373-2419, (1997).
CSIC NM014-Method of Preparation of Mesoporous Alumina with High Thermal Stability, http://www.serina.es/escaparate/verproducto.cgi?idproducto=4980&refcompra=NULO, downloaded May 9, 2007, 2 pages.
Davis, M.E., Ordered Porous Materials for Emerging Applications, Nature, 417:813-821 (2002).
Davis, M.E., Zeolite and Molecular Sieve Synthesis, Chem. Mater., 4:756-768 (1992).
De Moor, P-P.E.A. et al., Imaging the Assembly Process of the Organic-Mediated Synthesis of a Zeolite, Chem. Eur. J., 5(7):2083-2088 (1999).
Degnan, T.F. et al., History of ZSM-5 Fluid Catalytic Cracking Additive Development at Mobile, Microporous Mesoporous Mater., 35-36:245-252 (2000).
De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).
Galo, J. de A. A. et al., Chemical Strategies to Design Textured Materials: from Microporous and Mesoporous Oxides to Nanonetworks and Hierarchical Structures, Chern. Rev., 2002, 102, 4093-4138.
Geidel, E. et al., Characterization of Mesoporous Materials by Vibrational Spectroscopic Techniques, Microporous and Mesoporous Mater., 65:31-42 (2003).
Gonzalez-Pena, V. et al., Thermally Stable Mesoporous Alumina Synthesized with Non-ionic Surface in teh Presence of Amines, Microporous and Mesoporous Materials, 44-45, pp. 203-210 (2001).
Goto, Y., Mesoporous Material from Zeolite, Journal of Porous Materials, 9, 2002, pp. 43-48.
Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.
Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.
Harding, R.H. et al., New Developments in FCC Catalyst Technology, Appl. Catal. A:Gen. 221:389-396 (2001).
Huang, L. et al., Investigation of Synthesizing MCM-41/ZSM Composites, J. Phys. Chem. B. 104:2817-2823 (2000).
Iijima, S., Carbon Nanotubes: Past, Present, and Future, Physica B: Condensed Matter, www.elsevier.com/locate/physb, 2002, 323, pp. 1-5.
International Search Report and Written Opinion dated Nov. 7, 2005 from International Patent Application No. PCT/US2005/05918, filed Feb. 25, 2005.
Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.

Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).

Kloestra, K.R. et al., Mesoporous Material Containing Framework Tectosilicate by Pore-Wall Recrystallization, Chem. Commun., 23:2281-2282 (1997).

Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.

Lee, H. et al., Materials Science: On the Synthesis of Zeolites, ScienceWeek, downloaded from http://www.scienceweek.com/2003/sa031031-1.htm on Apr. 23, 2005, 5 pages.

Lin, C. et al., Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.

Linssen, T. et al., Mesoporous Templated Silicates: An Overview of Their Synthesis, Catalytic Activation and Evaluation of the Stability, Advances in Colloid and Interface Science, 103:121-147 (2003).

Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).

Liu, Y. et al., Aluminosilicate Mesostructures with Improved Acidity and Hydrothermal Stability, J. Mater. Chem., 12:3179-3190 (2002).

Lyons, D.M. et al., Preparation of Ordered Mesoporous Ceria with Enhanced Thermal Stability, The Journal of Materials Chemistry, vol. 12, pp. 1207-1212 (2002).

Mendes, M.F. et al., Optimization of the Process of Concentration of Vitamin E from DDSO using Supercritical CO2, Brazilian Journal of Chemical Engineering, vol. 22, No. 1, pp. 83-91, Jan.-Mar. 2005.

Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.

Ogura, M. et al., Formation of Uniform Mesopores in ZSM-5 Zeolite through Treatment in Alkaline Solution, Chemistry Letters 2000, pp. 882-883.

On, D.T. et al., Large-Pore Mesoporous Materials with Semi-Crystalline Zeolitic Frameworks, Angew. Chem. Int. Ed., 17:3248-3251 (2001).

Park, D.W. et al., Catalytic Degration of Polyethylene Over Solid Acid Catalysts, Polym. Degrad. Stabil., 65:193-198 (1999).

Patarin, J. et al., Mild Methods for Removing Organic Templates from Inorganic Host Materials, Highlights, Angew. Chem. Int. Ed. 2004, 43:3878-3880.

Prokesova, P. et al., Preparation of Nanosized Micro/Mesoporous Composites via Simultaneous Synthesis of Beta/MCM-48 Phases, Microporous and Mesoporous Materials 64 (2003) pp. 165-174.

Ryoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 7743-7746.

Scherzer, J. et al., Octane-Enhancing Zeolitic FCC Catalysts—Scientific and Technical Aspects, Marcel Dekker, Inc., 42 pages, (1990).

Storck, S. et al., Characterization of Micro- and Mesoporous Solids by Physisorption Methods and Pore-Size Analysis, Applied Catalysts A: Gen. 17:137-146 (1998).

Tao et al., Mesopore-Modified Zeolites: Preparation, Characterization, and Applications, Chem. Rev., vol. 106, pp. 896-910 (2006).

Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).

Verhoef, M. J. et al., Partial Transformation of MCM-41 Material into Zeolites: Formation of Nanosized MFI Type Crystallites, Chemical Materials, 2001, vol. 13, pp. 683-687.

Yang, P. et al., Generalized Syntheses of Large-Pore Mesoporous Metal Oxides with Semicrystalline Frameworks, Nature, vol. 396, Nov. 12, 1998, pp. 152-155; www.nature.com.

Ying, J. Y. et al., Synthesis and Applications of Supramolecular-Templated Mesoporous Materials, Angew. Chem. Int. Ed., 38:56-77 (1999).

Zhang, Z. et al, Mesoporous Aluminosilicates with Ordered Hexagonal Structure, Strong Acidity, and Extraordinary Hydrothermal Stability at High Temperatures, J. of the American Chem. Society, 2001, vol. 123, pp. 5014-5021.

* cited by examiner

METHODS OF RECOVERY OF PORE-FORMING AGENTS FOR MESOSTRUCTURED MATERIALS

CROSS REFERENCE TO RELATED APPLICATIONS

The present application claims the benefit of and priority to Spanish patent application no. P200702806, filed on Oct. 25, 2007, the entire disclosure of which is herein incorporated by reference.

FIELD OF THE INVENTION

The invention provides methods for recovering pore-forming agents (e.g., surfactants) from mesostructures and processes for making mesostructures.

BACKGROUND OF THE INVENTION

Methods for making mesostructured zeolites having long-range crystallinity, also described as full crystallinity, have been described. In these methods a mesostructured zeolite having long-range crystallinity is formed by exposing a crystalline inorganic material having long-range crystallinity to a pH controlled medium and a pore-forming agent under time and temperature conditions to form a plurality of mesopores having a controlled cross sectional area within the crystalline inorganic material having long-range crystallinity. In some embodiments, the long-range crystalline inorganic material is exposed to a pH controlled medium and a pore-forming agent (e.g., a surfactant). Once formed, the mesostructure solid is removed from the pH controlled medium and the pore-forming agent. The pH controlling medium and the pore-forming agent (e.g., surfactant) are then discarded.

It is desirable to minimize the waste associated with the methods of making the mesostructure. Minimizing processing waste is critical for both environmental considerations and to reduce costs associated with environmental waste disposal. Moreover, of the materials employed in the methods for making mesostructured zeolites the pore forming agent is comparatively costly.

The successful application of methods for making mesostructured zeolites having long-range crystallinity on an industrial scale may be limited, in part, by the costs associated with the raw materials employed in the method of making the mesostructures and by the costs associated with disposal of the waste material (e.g., a mixture of the pore-forming agent and/or the pH controlling medium). When mesostructures are produced on a large scale, the costs associated with sourcing and disposal of the waste material (e.g., the pore-forming agent) are prohibitive. Successful scale-up for commercial production of mesostructures relies on controlling raw material quantities, waste quantities, and associated costs.

SUMMARY OF THE INVENTION

In accordance with the methods of the invention, it has been discovered that at least a portion of the pore-forming agent used in making a mesostructure having long-range crystallinity can be recovered from the plurality of mesopores within the mesostructure. Surprisingly, the mesostructure having long-range crystallinity retains its structure even after exposure to the pore-forming agent recovery process. Alternatively, or in addition, the pore-forming agent can be recovered from the mixture of pore-forming agent and pH controlling medium in which that mesostructure was formed.

Once recovered from the mesostructure, the suspension, and/or the mixture, the pore-forming agent can be reused in, for example, a subsequent method of making a mesostructure. In still another alternative, after a first mesostructure is removed from the mixture in which it was formed the residual mixture can be adjusted to enable a subsequent mesostructure to be formed therein. For example, additional pore-forming agent can be added to adjust the mixture to enable a subsequent mesostructure to be formed therein, optionally, the additional pore-forming agent may be recovered from the first mesostructure. In some embodiments, the pH of the residual mixture is adjusted to enable a subsequent mesostructure to be formed therein. The residual mixture (i.e., the mother liquor) contains pore forming agent and pH controlling medium (e.g., a base) and, in some embodiments, contains only trace quantities of zeolite (i.e., trace quantities of Al and Si) that leached into the residual mixture when forming the mesostructured zeolite.

In one aspect, the invention provides a method of recovering a pore-forming agent from a mesostructure. The method includes contacting a mesostructure having long-range crystallinity with an extraction agent under conditions of pH, time and temperature sufficient to extract at least a portion of a pore-forming agent from the mesostructure. The mesostructure is an inorganic material defining a plurality of mesopores having a controlled cross sectional area and having long-range crystallinity. The extraction agent is separated from the mesostructure. The extraction agent can be selected from a solvent, an acid:solvent mixture, and a supercritical fluid. In one embodiment, after the extraction agent is separated from the mesostructure, the mesostructure is calcinated to remove any quantity of the pore-forming agent remaining in the mesopores. In another embodiment, after the extraction agent is separated from the mesostructure at least a portion of the pore-forming agent is separated from the extraction agent. The step of separating the pore-forming agent from the extraction agent can be carried out by one or more method selected from distillation, precipitation, filtration, and chemical reaction. In another embodiment, the recovered pore-forming agent is reused to make a mesostructure having long-range crystallinity from an inorganic material.

In another aspect, the invention provides a method of making a mesostructure that includes exposing an inorganic material having long-range crystallinity to a pH controlled medium and a pore-forming agent under a set of time and temperature conditions sufficient to define in the inorganic material a plurality of mesopores having a controlled cross sectional area, thereby forming a mesostructure having long-range crystallinity. The mesostructure is separated from the pH controlled medium and the pore-forming agent. The pore-forming agent is separated from the pH controlled medium. In one embodiment, the inorganic material is simultaneously exposed to the pH controlled medium and the pore-forming agent. In another embodiment, the inorganic material is sequentially exposed to the pH controlled medium and the pore-forming agent.

In one embodiment, the step of separating the mesostructure from the pH controlled medium and the pore-forming agent is carried out by one or more method selected from the group of filtration, centrifugation, and sedimentation. In another embodiment, the step of separating the pore-forming from the pH controlled medium is carried out by one or more method selected from of distillation, precipitation, filtration, and chemical reaction. Chemical reaction can include, for example, extraction. Suitable extraction agents can be selected from a solvent an acid:solvent mixture, and a supercritical fluid.

In another aspect, the invention provides a method of making multiple mesostructures, where the method includes exposing an inorganic material having long-range crystallinity to a pH controlled medium and a pore-forming agent under a set of time and temperature conditions sufficient to define in the inorganic material a plurality of mesopores having a controlled cross sectional area, thereby forming a mesostructure having long-range crystallinity. The mesostructure is separated from the pH controlled medium and the pore-forming agent. An adjusted mixture is provided by adjusting the pH level and/or the pore-forming agent quantity in the pH controlled medium and the pore-forming agent from which the mesostructure was separated. An additional inorganic material having long-range crystallinity is exposed to the adjusted mixture under a second set of time and temperature conditions sufficient to define, in the additional inorganic material, a plurality of mesopores having a controlled cross sectional area, thereby forming a mesostructure having long-range crystallinity. The pH level of the adjusted mixture may be adjusted by adding base to adjust the pH of the adjusted mixture. In one embodiment, the inorganic material is simultaneously exposed to the pH controlled medium and the pore-forming agent. In another embodiment, the inorganic material is sequentially exposed to the pH controlled medium and the pore-forming agent.

In one embodiment, the adjusted mixture is provided by adjusting the pH level by adding a pH controlling substance. In another embodiment, the adjusted mixture is provided by adjusting the pore-forming agent quantity by adding a quantity of a pore-forming agent. In another embodiment, the method of making multiple mesostructures includes repeating the steps of: separating the mesostructure from the pH controlled medium and the pore-forming agent, adjusting the pH level and a pore-forming agent quantity of the pH controlled medium and the pore-forming agent to provide an adjusted mixture, and forming a mesostructure having long-range crystallinity by exposing an additional inorganic material having long-range crystallinity to the adjusted mixture under a second set of time and temperature conditions sufficient to define, in the additional inorganic material, a plurality of mesopores having a controlled cross sectional area.

In another aspect, the invention provides a method of making multiple mesostructures, where the method includes (a) separating a mesostructure having long-range crystallinity and defining a plurality of mesopores having a controlled cross sectional from a pH controlled medium and a pore-forming agent, (b) adjusting a pH level and a pore-forming agent quantity of the pH controlled medium and the pore-forming agent to provide an adjusted mixture, (c) exposing an inorganic material having long-range crystallinity to the adjusted mixture under a set of time and temperature conditions sufficient to define, in the inorganic material, a plurality of mesopores having a controlled cross sectional area, thereby forming a mesostructure having long-range crystallinity, and (d) repeating steps (a)-(c). In one embodiment, step (b) further includes adding a pH controlling substance and adding a quantity of a pore-forming agent.

These embodiments of the present invention, other embodiments, and their features and characteristics, will be apparent from the description, drawings and claims that follow.

BRIEF DESCRIPTION OF THE DRAWINGS

The foregoing and other objects, feature and advantages of the invention, as well as the invention itself, will be more fully understood from the following illustrative description, when read together with the accompanying drawings which are not necessarily to scale.

DETAILED DESCRIPTION OF THE INVENTION

The invention provides methods of recovering a pore-forming agent from a mesostructure and also methods of making one or more mesostructures that features removal and/or recovery of the pore-forming agent. Pore-forming agents include, for example, surfactants.

Mesostructures having long-range crystallinity are produced by exposing an inorganic material having long-range crystallinity to a solution including a pH controlling substance and a pore-forming agent (e.g., a surfactant) under a set of time and temperature conditions to define, in the inorganic material, a plurality of mesopores having a controlled cross sectional area. The order of addition of the pH controlled medium and the surfactant is immaterial to the process. For example, a zeolite is an inorganic material having long-range crystallinity that can be added to a pH controlled medium containing a surfactant. Alternatively, a pH controlled medium can be added to a zeolite and a surfactant. In one embodiment, a zeolite is added to a pH controlled medium and thereafter a surfactant is added.

The Structure of a Mesostructure

Figure 1:
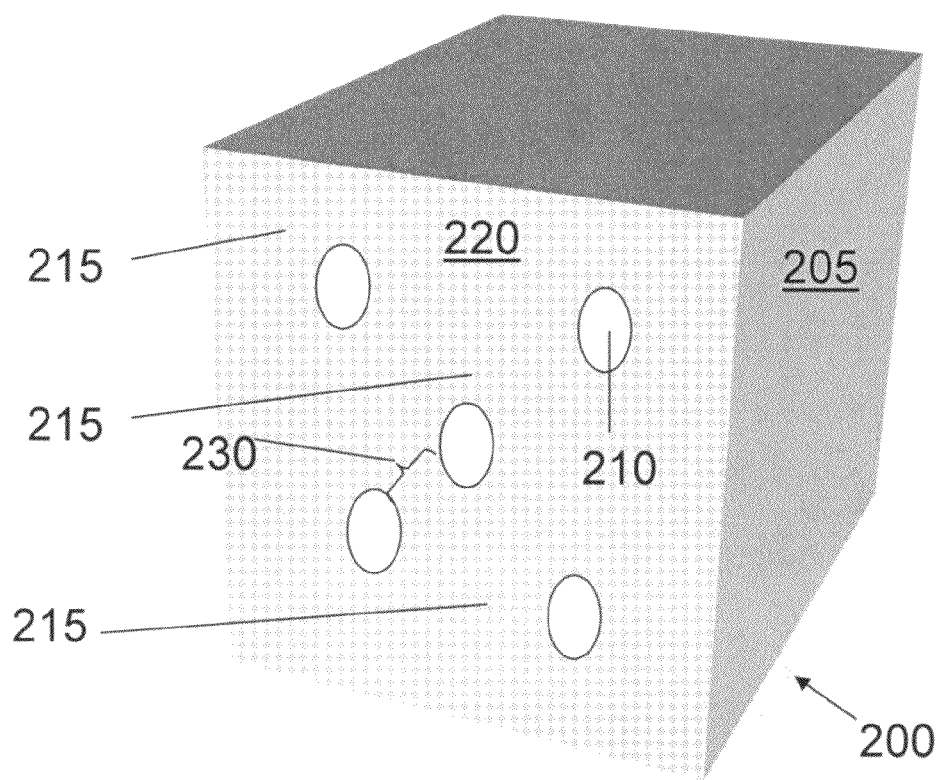
FIG. 1 is a schematic illustration of a mesostructured zeolite having long-range crystallinity.

FIG. 1 is a schematic illustration of a mesostructure having long-range crystallinity 200. The mesostructure 200 features a zeolite structure 205 having long-range crystallinity with a plurality of mesopores 210 penetrating throughout the volume of the zeolite structure 205. The portion 215 of the mesostructure 200 that surrounds each mesopore 210 has long-range crystallinity. The pore wall or interior wall between adjacent mesopores has a wall thickness 230. As illustrated in FIG. 1, the portion 215 of the mesostructure and the mesopores 210 are viewed from a side 220 of the zeolite structure 205. Although not depicted in this schematic illustration, the mesopores can be viewed from other sides of the mesostructure 200.

Figure 2:
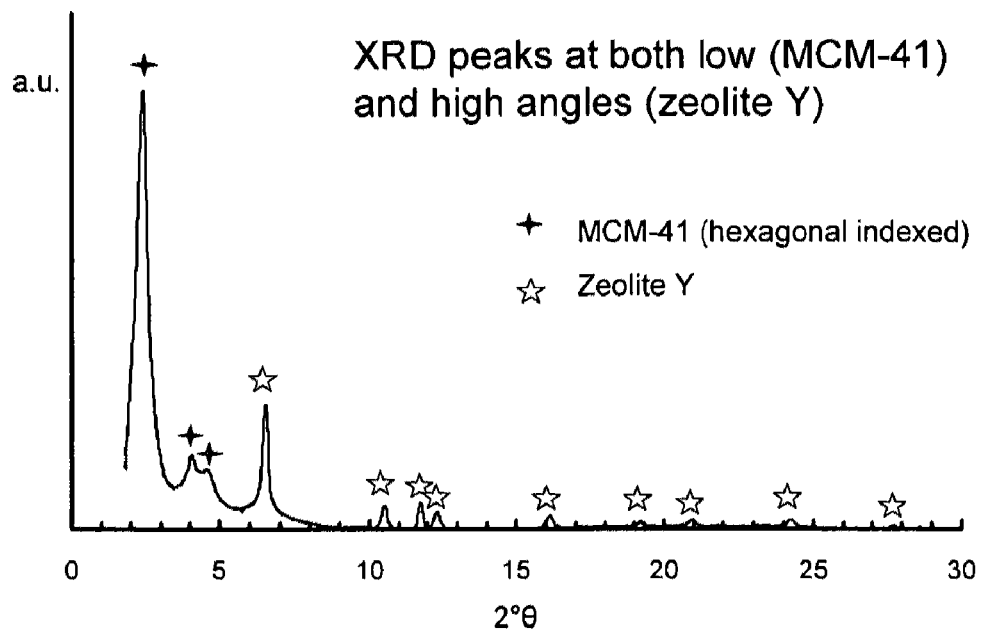
FIG. 2 depicts the X-ray diffraction pattern of the zeolite Y having long-range crystallinity and the mesostructured zeolite H-Y[MCM-41] having long-range crystallinity. The ordered mesostructure having long-range crystallinity H-Y [MCM-41] (revealed by the XRD peaks at low angles) and the unmodified zeolite Y having long-range crystallinity structure Y are present.

The structure of the mesostructures having long-range crystallinity can be studied via various techniques including x-ray diffraction (XRD), infrared spectroscopy (FTIR), adsorption isotherms, and transmission electronic microscopy (TEM). FIG. 2 shows the XRD patterns of a mesostructure H-Y[MCM-41]. As used herein, a naming convention for mesostructured zeolites, e.g., H-Y[MCM-41] first includes the starting inorganic material, here a zeolite, structure, e.g., H-Y and then, placed adjacent, in brackets, is the name of the mesostructure, e.g., [MCM-41]. The mesostructured zeolite H-Y[MCM-41] retains the long-range crystallinity, also called full crystallinity, of the zeolite H-Y, and features hexagonal pores [MCM-41]. The mesostructure is formed from a plurality of mesopores in a hexagonal pattern [MCM-41] that are defined in the zeolite H-Y. The mesostructure H-Y[MCM-41] has long-range crystallinity.

FIG. 2 depicts the X-ray diffraction pattern of the a mesostructure having long-range crystallinity, the mesostructured zeolite H-Y[MCM-41]. Both the order MCM-41 (revealed by the XRD peaks at low angles) and the zeolitic structure H-Y having long-range crystallinity are present in the mesostructure. Referring still to FIG. 2, intense peaks, both at low and high 2°θ values reveal both the ordered mesostructure and the zeolitic crystallinity of this family of materials. The peaks at low 2°θ values can be indexed to hexagonal symmetry indicating the presence of MCM-41, whereas the well-defined XRD peaks at high 2θ0 values correspond, respectively, to the zeolite, e.g., zeolite Y. This X-ray diffraction pattern shows that the mesostructure retains long-range crystallinity.

Figure 3:
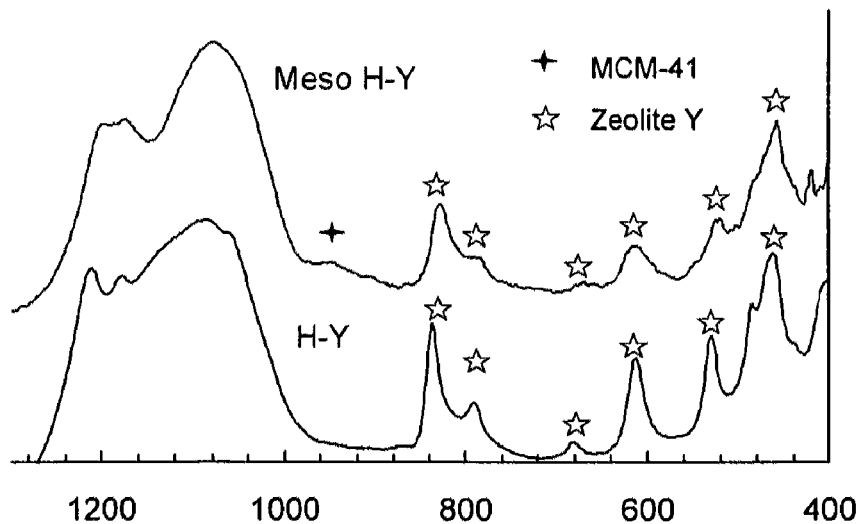
FIG. 3 depicts FTIR characterization peaks for the mesostructured zeolite H-Y[MCM-41] having long-range crystallinity, labeled Meso-H-Y, and the unmodified zeolite Y, labeled H-Y.
Figure 4:
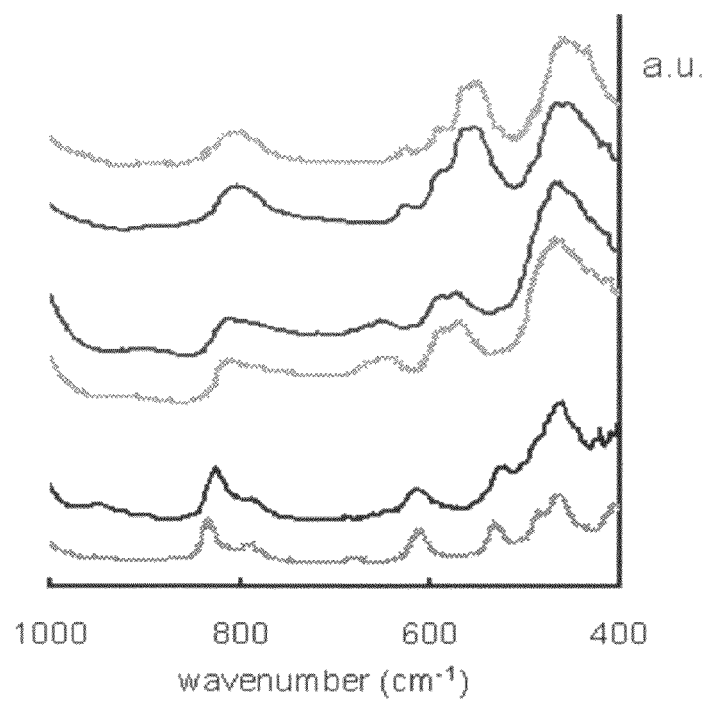
FIG. 4 depicts FTIR spectra of mesostructured zeolites having long-range crystallinity H-Y[MCM-41] (upper top), H-MOR[MCM-41] (upper middle), H-ZSM-5-[MCM-41] (upper bottom) and FTIR spectra of their unmodified zeolites having long-range crystallinity H-Y (lower top), H-MOR (lower middle), H-ZSM-5 (lower bottom). A match between each mesostructure having long-range crystallinity and its corresponding unmodified zeolite having long-range crystallinity is observed, indicating the fully zeolitic connectivity present in the mesostructures having long-range crystallinity.

The connectivity of mesostructures having long-range crystallinity can be studied by infrared spectroscopy (FTIR) (See FIGS. 3-4). FIG. 3 depicts FTIR characterization peaks for the mesostructure having long-range crystallinity, H-Y [MCM-41] labeled Meso-H-Y, and zeolite Y having long-range crystallinity labeled H-Y. Referring still to FIG. 3, the FTIR spectra of the mesostructure H-Y[MCM-41], labeled Meso-H-Y, is on the top and the FTIR spectra of the unmodified conventional long-range crystalline zeolite H-Y is on the bottom. Still referring to FIG. 3, the FTIR characterization peaks reveal that the connectivity found in the unmodified zeolite Y, labeled H-Y, remains present when the unmodified zeolite is transformed into the mesostructure, labeled Meso-H-Y.

FIG. 4 depicts FTIR spectra of mesostructures having long-range crystallinity, H-Y[MCM-41] (upper top), H-MOR[MCM-41] (upper middle), H-ZSM-5-[MCM-41] (upper bottom), and FTIR spectra of their zeolitic versions having long-range crystallinity in conventional, unmodified form, H-Y (lower top), H-MOR (lower middle), H-ZSM-5 (lower bottom). The spectrum of the mesostructured zeolite H-Y[MCM-41] is the upper top spectrum (lighter line) and the spectrum of the unmodified zeolite H-Y is the lower top spectrum (darker line). The spectrum of the mesostructured zeolite H-MOR[MCM-41] is the upper middle spectrum (darker line) and the spectrum of the unmodified zeolite H-MOR is the lower middle spectrum (lighter line). The spectrum of the mesostructured zeolite H-ZSM-5-[MCM-41] is the upper bottom spectrum (darker line) and the spectrum of the unmodified zeolite H-ZSM-5 is the lower bottom spectrum (lighter line). In FIG. 4 a match between each long-range crystalline mesostructure and its corresponding unmodified long-range crystalline zeolite is observed, indicating the zeolitic connectivity present in the unmodified long-rang crystalline zeolite remains present in long-range crystalline mesostructures. FIG. 4 shows a remarkable match between the IR spectra of the mesostructured zeolites H-Y[MCM-41], H-MOR[MCM-41], and H-ZSM-5-[MCM-41] and the IR spectra of the their corresponding unmodified zeolitic versions, H-Y, H-MOR, H-ZSM-5.

Figure 5:
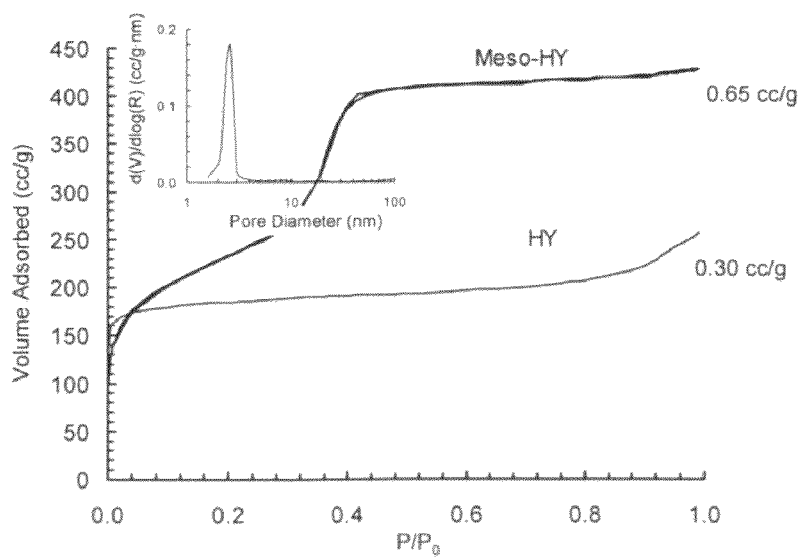
FIG. 5 depicts the nitrogen adsorption isotherm at 77 K of the mesostructured zeolite having long-range crystallinity H-Y[MCM-41], labeled Meso-H-Y, and the unmodified zeolite having long-range crystallinity, H-Y. The pore size distribution (BJH method) of the mesostructure having long-range crystallinity labeled Meso-HY is included in inset. The presence of well developed narrow pore size mesoporosity in the mesostructure is evident by the sharp uptake at $P/P_0 \sim 0.3$.

The presence of well-defined mesoporosity in mesostructured zeolites can be suitably studied by nitrogen adsorption at 77 K. FIG. 5 shows the nitrogen adsorption isotherm at 77 K of the long-range crystalline mesostructured zeolite, H-Y [MCM-41], labeled Meso-HY, and its unmodified zeolitic version, H-Y. The presence of well developed narrow pore size diameter distribution mesoporosity is evident in the mesostructured sample. The pore size of the mesoporosity is controlled such that the diameter and/or the cross sectional area of each of the mesopores in a specific long-range crystalline mesostructure falls within a narrow pore size distribution (e.g., a narrow pore size diameter distribution). In one embodiment, the diameter has a value within the range of from about 2 nm to about 60 nm, or from about 10 nm to about 30 nm, for example. In accordance with the long-range crystalline mesostructures, in one embodiment, more than 95% of the mesopores have a pore size (e.g., a diameter and/or a cross sectional area) that falls within plus or minus 10% of the average pore size. In another embodiment, more than 95% of the mesopores have a pore size (e.g., a diameter and/or a cross sectional area) that falls within plus or minus 30% of the average pore size. In still another embodiment, more than 95% of the mesopores have a pore size (e.g., a diameter and/or a cross sectional area) that falls within plus or minus 75% of the average pore size. Each pore wall or mesopore surface that surrounds a diameter controlled mesopore is substantially similar in size. The long-range crystalline mesostructure has controlled mesoporosity pore size cross sectional area. Where the mesopores are substantially cylindrical in shape in addition to having a pore size cross sectional area these pores have a pore size diameter. However, where the shape of the mesopores is not cylinder like and is, for example, slit shaped, a non defined shape, or worm-like, e.g., with a changing diameter throughout at least a portion of the depth of the mesopore surface that surrounds an exemplary mesopore then at least a portion of such a mesopore surface has a controlled mesopore cross sectional area. The size, of the mesopores is controlled by, for example, the selected surfactant and/or quantity of surfactant used when making a long-range crystalline mesostructure from a conventional unmodified zeolite having long-range crystallinity. Prior attempts to incorporate mesostructures into zeolites have been unable to achieve such a controlled mesoporosity in which substantially all mesopores in a zeolite have a substantially similar size (e.g., diameter and/or cross sectional area) and a controlled pore arrangement (e.g., [MCM-41] having a hexagonal pore arrangement). On the contrary, prior attempts to form mesostructures in zeolites resulted in any or a combination of a broader pore size distribution ranging from small, medium, to large size pores, different shaped pores, and/or uncontrolled arrangements.

A significant volume of mesoporosity can be introduced into the sample. For example, referring to FIG. 5, in one embodiment the mesopore volume is roughly doubled when the zeolite is mesostructured. In this example, the unmodified long-range crystalline zeolite H-Y had a mesopore volume pf 0.30 cc/g whereas the long-range crystalline mesostructured zeolite labeled Meso-HY, which is HY[MCM-41], has a mesopore volume of 0.65 cc/g. Conventional zeolites such as HY adsorb nitrogen only at low pressures, producing type I isotherms that are characteristic of microporous materials. However, the mesostructures show sharp nitrogen uptakes at higher partial pressures ($P/P_0$~0.3-0.4), which is a characteristic feature of mesostructured materials with narrow pore-size distribution (pore diameter ~2.5 nm).

Figure 6:
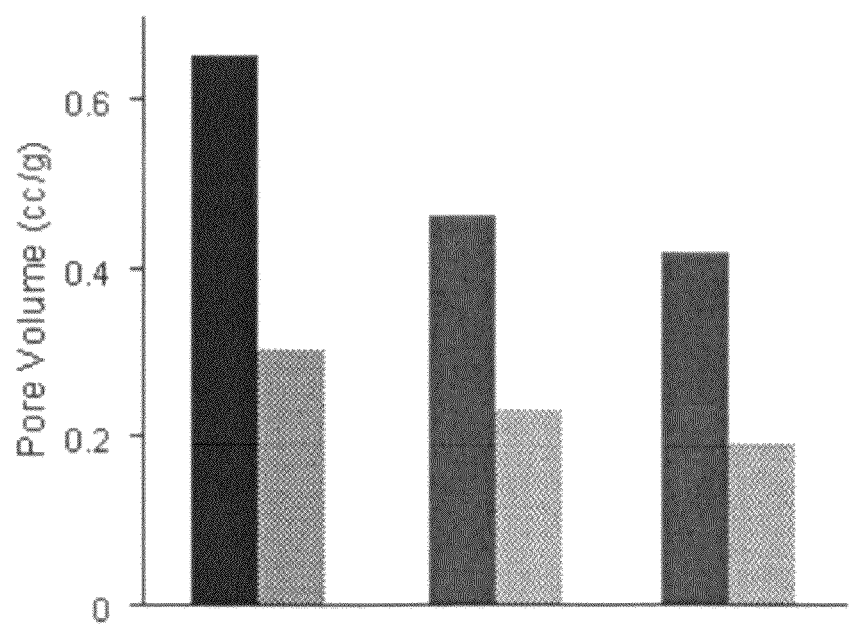
FIG. 6 depicts pore volumes (darker columns) of mesostructures having long-range crystallinity H-Y[MCM-41] (left), H-MOR[MCM-41] (center), and H-ZSM-5-[MCM-41] (right) and the unmodified zeolites having long-range crystallinity prior to transformation to provide mesostructures (lighter columns) of H-Y (left), H-MOR (center), and H-ZSM-5 (right).

FIG. 6 depicts mesostructured zeolite pore volumes (darker columns) of H-Y[MCM-41] (left), H-MOR[MCM-41] (center), and H-ZSM-5-[MCM-41] (right) and their zeolitic versions (lighter columns) of H-Y (left), H-MOR (center), and H-ZSM-5 (right). Compared to conventional zeolites, the long-range crystalline mesostructured zeolites have more than double the pore volume (see FIG. 6) due to the incorporation of a well-developed, narrow distribution of pore-size diameter mesoporosity. Referring still to FIG. 6, the volume of mesoporosity that is incorporated can be controlled. The long-range crystalline mesostructured zeolite mesoporosity volume is controlled by, for example, the quantity of surfactant added as a percentage of the quantity of zeolite. Other factors that contribute to mesoporosity volume include the pH, time, and temperature conditions employed. In one embodiment, the quantity of the pH controlling substance and the quantity of a liquid sufficient to dissolve the pH controlling substance that is added is an amount suitable to achieve the desired surfactant concentration in view of the amount of zeolite. The pore volume is expressed in cc/g, the cubic centimeters of pores over the grams of the zeolite. The mesostructure having long-range crystallinity has a pore volume that is a value within the range of from about 0.05 cc/g to about 2 cc/g, or from about 0.5 cc/g to about 1 cc/g. The mesopore size is controlled and the mesopore volume is controlled by the type and the quantity of surfactant used to create the zeolite mesostructure from the zeolite. The time and temperature conditions also contribute to the mesopore size and/or the mesopore volume.

The mesostructured zeolites have sharper uptake at low partial pressures, which indicates the presence of mesoporosity, and slightly higher pore size. The size of the mesopore can be easily tuned or controlled by changing the length of the aliphatic chain of the surfactant. Optionally, the mesopore pore size diameter also can be controlled by, for example, the choice of surfactant and/or the quantity of the surfactant.

Methods of making a mesostructure having long-range crystallinity from a zeolite having long-range crystallinity are based on the short-range reorganization of a zeolite structure in the presence of a surfactant to accommodate mesoporosity without loss of zeolitic long-range crystallinity. Without being bound to any one theory, it is believed that exposure to the pH controlling medium "softens" a surface of a conventional zeolite having long-range crystallinity. Stated technically, the conventional zeolite surface is "softened" when there is short-scale bond breaking and reconstruction of the zeolite crystal. The "softened" zeolite surface enables the pore-forming agent (i.e., a surfactant) to penetrate the zeolite to define or create mesopores in the zeolite, which forms the mesostructured zeolite (i.e., a mesostructure having long-range crystallinity). The short-scale bond breaking and reconstruction of the zeolite crystal accommodates the surfactant by base-assisted reaction and rearrangement that does not cause crystal dissolution.

More specifically, the pH conditions that are employed enable the surfactant to penetrate the structure of the zeolite. However, the pH conditions do not dissolve the zeolite. As the surfactant penetrates the zeolite, forming a plurality of mesopores, the penetrated portion is exposed to the pH controlling medium and is "softened" (e.g., experiences short-scale bond breaking and reconstruction), enabling further penetration by the surfactant. The penetration continues in this fashion throughout the volume of the zeolite. The penetration through the zeolite volume may be in any single direction or in a combination of directions, for example, the penetration may be through the x direction, the y direction, the z direction, or any combination thereof. The penetration direction or rate is not necessarily linear. Penetration can be controlled to be ordered or, optionally, the penetration and consequently the mesopores may be disordered or random. Optionally, one or more of the mesopores intersect, interconnect, converge, and/or align, which impacts the arrangement of the resulting mesopores defined within the zeolite that form the mesostructure. The mesostructure retains the long-range crystallinity of the zeolite. The surfactant enables penetration into the zeolite having long-range crystallinity, creating mesopores. The type of surfactant determines, at least in part, the size of the mesopore including, for example, the size of the mesopore diameter and/or the size of the mesopore cross section. Penetration into the conventional fully crystalline zeolite is not observed where a controlled pH solution, for example, a base having a pH of 10, held at controlled time and temperature conditions, is mixed with a zeolite without a surfactant. It is believed that the surfactant is accommodated within the crystal and incorporation of the surfactant produces an expansion of the zeolite crystal size. There is no leaching (e.g., dissolution of the material), as is demonstrated after the mesostructure is formed and removed from solution by the absence of Si or Al that form the zeolite remaining in the solution. In one embodiment, there remain only trace amounts of Si and Al in the mother liquor.

Inorganic Material

The inorganic material can have, for example, a 1D pore structure, a 2D pore structure, or a 3D pore structure prior to defining the plurality of mesopores. An inorganic material having long-range crystallinity has a regular lattice structure or a regular framework of the crystalline state that repeats periodically. Materials that have this regular lattice structure of the crystalline state are also referred to as being truly crystalline and/or fully crystalline. Materials having such a regular lattice structure show peaks at both low and high angles when they are subject to x-ray diffraction. Mesostructures having long-range crystallinity can be formed from any of a number of inorganic materials, including, for example a metal oxide, a zeolite, a zeotype, alum inophosphate, gal lophosphate, zincophosphate, titanophosphate, faujasite (FAU), mordenite (MOR), ZSM-5 (MFI), or CHA, or any combination of these. In addition, mesostructures can be formed from zeolite-like materials, which represent a growing family of inorganic and organic/inorganic molecular sieves. Long-range crystallinity includes all solids with one or more phases including repeating structures, referred to as unit cells, that repeat in a space for at least 10 nm. A long-range crystalline zeolite structure may have, for example, single crystallinity, mono crystallinity, or multi crystallinity. Multi crystallinity includes all solids having more than one phase having repeating structures, referred to as unit cells, that repeat in a space for at least 10 nm. It is expected that any crystalline inorganic material having long-range crystallinity would have a similar structure, would similarly be produced, and/or would similarly be employed where, for example, a zeolite, a fully crystalline zeolite, a zeolite having long-range crystallinity, or zeolites is described.

pH Controlled Medium

In accordance with the step of exposing the crystalline inorganic material to a pH controlled medium, the pH controlled medium can include a pH value within the range of from about −2 to about 6 and from about 8 to about 14. The pH controlled medium can include, for example, a base such as tetramethyl ammonium hydroxide, $NH_4OH$, or NaOH. The pH controlled medium can have a pH value within the range of from about 8 to about 12, or from about 9 to about 11, or alternatively, the basic medium pH can be about 10. Any suitable basic medium can be employed that has a pH value that falls within the desired pH range. A strong basic medium has, for example, a pH value within the range of from about 11 to about 14, or from about 12 to about 13. Alternatively, the pH controlled medium can include an acid, for example, aqueous HF having, for example, a pH that has a value within the range of from about 2 to about 6, or from about 3 to about 5, or at about 4. Acids may be employed for certain very stable zeolites (e.g., ZSM-5, MOR, CHA etc.). In some embodiments, after exposure to an acid the pH is increased to a pH value within the range of from about 9 to about 11 by adding a base. In one embodiment, the pH has a value within the range of from about 9 to about 12 and the surfactant is a cationic surfactant. In another embodiment, the pH has a value within the range of from about −2 to about 2 and the surfactant can be a neutral surfactant, an anionic surfactant, or combination of these. The pH controlled medium can be selected to control a diameter of each of the plurality of mesopores, to control a cross sectional area of each of a plurality of mesopores, and/or to control a pore volume of the plurality of mesopores that define the mesostructure. Optionally, the method can further include a step of adding a swelling agent, a triblock copolymer, a nanoparticle, a biomolecule, a mineralizing agent, a co-surfactant, a metal oxide precursor, a silica solubilizing agent, an alumina solubilizing agent, or any combination of these to the pH controlled medium.

Pore-Forming Agent

In accordance with the step of exposing the inorganic material to a pore-forming agent (e.g., a surfactant), suitable surfactants that can be employed include cationic, ionic, neutral surfactants and/or combinations of these. Exemplary surfactants include, for example, hexadecyltrimethylammonium bromide, or cetyltrimethylammonium bromide (CTAB). The quantity of surfactant is varied according to, for example, the surfactant and the inorganic material (e.g., zeolite) that are mixed. For example, in one embodiment, the weight of surfactant is about equal to the weight of zeolite added to the solution. Alternatively, the weight of surfactant can be about half of the weight of zeolite added to the solution. The quantity of surfactant can be selected to control: pore volume of one or more mesopores; diameter of one or more of the plurality of mesopores; or cross sectional area of one or more of the plurality of mesopores that define, in the inorganic material, the mesostructure. In embodiments where a neutral surfactant is employed, for example, PLURONIC(C) (available from BASF (Florham Park, N.J.)), the pH controlling medium has a pH value within the range of from about −2 to about 2, or from about −1 to about 1, or at about 0.

Time and Temperature

Generally, the time and temperature are related such that a higher temperature requires a shorter period of time to achieve a desired mesoporosity and a certain mesostructure as compared to a lower temperature, which would require a relatively longer period of time to achieve the same mesoporosity. Time and temperature conditions can be selected to allow the inorganic material having long-range crystallinity (e.g., zeolite) to achieve a desired mesostructure.

Controlling the exposure to a pH controlled medium and the exposure to a surfactant under a set of time and temperature conditions involves tailoring the pH controlled medium and the resulting pH level, the selected surfactant and the quantity of the surfactant together with the selected temperature and the selected time to define in the inorganic material a plurality of mesopores. By controlling the inorganic material exposure to a pH controlled medium and a surfactant under suitable time and temperature conditions the plurality of mesopores, for example, the quantity, pore volume, pore size, mesopore diameter, depth, and cross sectional area defined in the inorganic material is controlled.

The temperature conditions can have a value within the range of from about room temperature to about 60° C., from about 100° C. to about 200° C., or above 60° C. In one embodiment, the temperature has a value of about 100° C. or greater and the controlled temperature conditions take place under hydrothermal conditions, for example, in a sealed reactor and autogenous pressure is created within the sealed reactor. The time period ranges from a time value within the range of from about one hour to about two weeks. The mixture can be held at room temperature and stirred for a time value within the range of from about 1 day to about 1 week. Alternatively, the mixture is hydrothermally treated. In one embodiment, the mixture is hydrothermally treated at about 120° C. for a time period having a value within the range of from about 4 hours to about 1 week. During hydrothermal treatment the mixture can be stirred by, for example, rotating the vessel (i.e., rotating a sealed reactor or an autoclave). Alternatively or in addition, the contents of the vessel can be stirred by employing one or more stirrer inside the vessel to stir the mixture during the hydrothermal treatment. Stirring the mixture avoids sedimentation and improves distribution of the mixture within the vessel.

The mixture is hydrothermally treated for a period of time that is selected to allow the zeolite having long-range crystallinity to form a plurality of mesopores having a controlled cross sectional area forming a mesostructure having long-range crystallinity. The mesostructure can be, for example: H-Y[MCM-41], a mesostructure of an acidic form of faujasite (i.e., H-Y) having long-range crystallinity and having a hexagonal mesopore arrangement (i.e., [MCM-41]), H-Y[MCM-48], a mesostructure of an acidic form of faujasite having long-range crystallinity and having a cubic pore arrangement, or H-Y[MCM-50], a mesostructure of an acidic form of faujasite having long-range crystallinity and having a lamellar pore arrangement, etc. In one embodiment, the mesostructure has non-ordered (e.g., random) mesoporosity and contains silica and alumina metals. The mesostructure can have a low Si/Al ratio, for example.

The mesopore size and architecture may also be conveniently tuned by the use of surfactants with different aliphatic chain lengths, non-ionic surfactants, triblock copolymers, swelling agents, etc. For example, use of a surfactant with longer chain length increases pore size and conversely, use of surfactants with a shorter chain length decreases pore size.

For example, use of a swelling agent will expand the surfactant micelles. Any of these mesopore size and mesostructure architecture-altering properties may be used either alone or in combination. Also, post-synthesis treatments (e.g., silanation, grafting, surface functionalization, ion-exchange, immobilization of homogeneous catalysts and deposition of metal nanoclusters) could be employed to further improve the textural properties of the materials and/or modify their surface chemistry.

Pore-Forming Agent Recovery and/or Reuse

Methods can be employed to recover and/or reuse at least a portion of the pore-forming agent (e.g., a surfactant) that was employed to make the mesostructure having long-range crystallinity. At least a portion of the pore-forming agent can be recovered from the mesostructured material. It is desirable to remove some or all of the pore-forming agent from the mesostructure, for example, to enable reuse of the pore-forming agent when making subsequent mesostructures. Alternatively or in addition, at least a portion of the pore-forming agent can be recovered from the method of making the mesostructure. At least a portion of the pore-forming agent is a commercially reasonable quantity of the pore-forming agent recovered from, for example, the mesostructure and/or from the method of making the mesostructure. For example, where at least a portion of the pore-forming agent is recovered from the mesostructure, the quantity of recovered pore-forming agent relative to the quantity of pore-forming agent retained within the mesostructure when the mesostructure was formed is from about 40 weight percent to about 90 weight percent, from about 50 weight percent to about 80 weight percent, or from about 60 weight percent to about 70 weight percent. Where at least a portion of the pore-forming agent is recovered from the method of making the mesostructure, the quantity of recovered pore-forming agent relative to the quantity of pore-forming employed in the method is from about 20 weight percent to about 40 weight percent, or about 30 weight percent.

In addition, multiple mesostructures can be formed in a mixture of pH controlled medium and pore-forming agent by adjusting the pH level and/or the pore-forming agent quantity in the mixture after each use. Recovering and/or reusing at least a portion of the pore-forming agent reduces waste, costs associated with waste disposal, and raw material requirements. Also, recovery of the pore-forming agent reduces raw material costs associated with making the mesostructure.

Methods of Recovering a Pore-Forming Agent from a Mesostructure

In one embodiment, a pore-forming agent is recovered from a mesostructure. Such methods include contacting a mesostructure having long-range crystallinity with an extraction agent under conditions of time and temperature sufficient to extract at least a portion of a pore-forming agent from the mesostructure. The mesostructure is an inorganic material defining a plurality of mesopores having a controlled cross sectional area and having long-range crystallinity. The extraction agent is separated from the mesostructure.

The extraction agent can be selected from a solvent, an acid:solvent mixture, and a supercritical fluid. Solvent extraction separates materials of different chemical types and different solubilities by selective solvent action. For example, solvent extraction takes advantage of the fact that some materials are more soluble in one solvent than in another solvent. Accordingly, there is a preferential extractive action based upon solubility. Solvents that can be employed to remove at least a portion of a pore-forming agent from the mixture of the pH controlled medium and the pore-forming agent via solvent extraction separation include alcohol (e.g., methanol, ethanol, and isopropyl alcohol), acetone, dimethylformamide, methylpyrrolidone, halogenated solvents, and acetonitrile.

Solvent extraction can be conducted at a temperatures ranging from about room temperature to about the boiling point temperature of the solvent. Solvent extraction of the pore-forming agent can include, for example, reflux extraction. In one embodiment, removal of the pore-forming agent from the mixture is conducted at about the boiling point of the solvent in a sealed vessel.

Acid:solvent extraction may be employed to extract at least a portion of the pore-forming agent mesostructure. Suitable acids that can be employed in acid:solvent extraction include, inorganic acids such as, for example, hydrochloric acid, nitric acid, and sulphuric acid. Suitable acids have a pH value of about 2 pH or greater than 2 pH. Alternatively, or in addition, organic acids such as, for example, sulphonic acids, carboxylic acids, and halogenated acids may be employed. Suitable acids have a pH value of about 2 pH or greater than 2 pH. Non limiting examples of solvents that may be employed include alcohol (e.g., methanol, ethanol, and isopropyl alcohol), acetone, dimethylformamide, methylpyrrolidone, halogenated solvents, and acetonitrile. After acid:solvent extraction the acid employed in the acid:solvent extraction can be neutralized via acid neutralization. Acid neutralization involves exposing the filtrate to an acid neutralizing agent, typically a base that includes substances that cause precipitation of the acid anion. Suitable acid neutralizing agents include, for example, calcium carbonate, calcium bicarbonate, and calcium sulfate. The precipitate of the acid anion is then filtered and is disposed.

The acid:solvent extraction can be carried out at a temperature ranging from about room temperature to about the boiling point temperature of the solvent. Acid:solvent extraction of at least a portion of the pore-forming agent can include, for example, reflux extraction. In one embodiment, removal of the pore-forming agent from the mixture is conducted at about the boiling point of the solvent in a sealed vessel.

The solvent and acid:solvent extraction methods may further employ distillation of the solvent to recover the pore-forming agent. In one embodiment, distillation of the solvent is carried out by boiling out the solvent, which has a lower boiling point than the pore-forming agent (e.g., a surfactant).

Supercritical fluid extraction can be employed to remove the pore-forming agent from the mesostructure Supercritical fluids are produced by heating a gas above its critical temperature or compressing a liquid above its critical pressure. Under these conditions, the molar volume is the same whether the original form was a liquid or a gas. Supercritical fluids can be used to extract a pore-forming agent from the mesostructure. An advantage of using supercritical fluids for extraction is that they are inexpensive, contaminant free, and less costly to dispose safely than organic solvents. The properties of Supercritical fluids also provide some advantages for analytical extractions. Supercritical fluids can have solvating powers similar to organic solvents, but with higher diffusivities, lower viscosity, and lower surface tension. The solvating power can be adjusted by changing the pressure or temperature, or adding modifiers to the supercritical fluid. Supercritical fluid extraction can employ, for example, $CO_2$, alcohols (e.g., methanol), ammonia, halogenated methane and halogenated hydrocarbons. Methanol (typically 1-10%) is commonly used as a modifier to increase the polarity of supercritical $CO_2$.

In one embodiment, after the extraction agent is separated from the mesostructure, the mesostructure is calcinated to remove any quantity of the pore-forming agent remaining in the mesopores. In another embodiment, after the extraction agent is separated from the mesostructure at least a portion of the pore-forming agent is separated from the extraction agent. The step of separating the pore-forming from the extraction agent can be carried out by one or more method selected from distillation, precipitation, filtration, and chemical reaction. In another embodiment, the recovered pore-forming agent is reused to make a mesostructure having long-range crystallinity from an inorganic material. Extraction can be conducted successively to increase the quantity of pore-forming agent removed from the mesostructure with each successive entraction. The quantity of pore-forming agent removed from the mixture of the pH controlled medium and the pore-forming agent can range from about 65 weight percent to about 100 weight percent, from about 75 weight percent to about 90 weight percent, or about 80 weight percent.

Methods of Making a Mesostructure

Mesostructures having long-range crystallinity are made by exposing an inorganic material having long-range crystallinity to a pH controlled medium and a pore-forming agent under a set of time and temperature conditions sufficient to define in the inorganic material a plurality of mesopores having a controlled cross sectional area, thereby forming a mesostructure having long-range crystallinity. In the method of making a mesostructure, the inorganic material can be exposed to the pH controlled medium and the pore-forming agent simultaneously or sequentially, for example. The mesostructure is separated from the pH controlled medium and the pore-forming agent. The pore-forming agent is separated from the pH controlled medium.

Any of a number of separation techniques can be employed to separate the formed mesostructure from the pH controlled medium and the pore-forming agent. Suitable physical separation techniques include, for example, filtration, centrifugation, sedimentation, or any combination of these. Filtration techniques that can be employed include, for example, vacuum filtration, pressure filtration, gravity filtration, manual pressure filtration, or other filtration techniques and methods known to the skilled person. Centrifugation employs centrifugal force for the separation of mixtures. Sedimentation includes allowing sufficient time for the action of gravity to settle the mesostructure from the mixture.

The step of separating the pore-forming from the pH controlled medium can be carried out by one or more method selected from distillation, precipitation, filtration, and chemical reaction, for example. Distillation separates substances based on differences in their volatilities. Distillation processes may be continuous, semi continuous, or batch processes. The type of distillation may be simple distillation in which hot vapors produced are immediately channeled into a condenser that cools and condenses the vapors.

Simple distillation is generally employed to separate liquids whose boiling points are substantially different, e.g., about 25° C., or to separate liquids from involatile solids. Alternatively, fractional distillation may be employed where, for example, the boiling points of the components in the mixture are sufficiently close. Generally, fractional distillation is used in order to separate components by repeated vaporization-condensation cycles within a packed fractionating column.

Vacuum distillation may be employed where some compounds have very high boiling points. To boil such compounds, it is often better to lower the pressure at which such compounds are boiled instead of increasing the temperature. Once the pressure is lowered to the vapor pressure of the compound (at the given temperature) boiling and the rest of the distillation process can commence. This technique is referred to as vacuum distillation.

Short path distillation is a technique that involves the distillate traveling a short distance. Advantages are that the temperature of the boiling liquid does not have to be much higher than the boiling point of the distilling substance, and the gases only have to travel a short distance while in the gas-phase before they can be cooled again to a lower temperature. The distillation technique can be selected in accordance with the mixture, the pH controlled medium, the pore-forming agent, and the mesostructure, for example.

Precipitation is the formation of a solid in a solution during a chemical reaction. The solid formed is called the precipitate and, as employed in the method, the precipitate removed from the mixture is the pore-forming agent. Filtration can be employed to remove the pore-forming agent from the mixture. Suitable filtration techniques include, for example, vacuum filtration, pressure filtration, gravity filtration, manual pressure filtration, or other filtration techniques and methods known to the skilled person Chemical reaction can include, for example, extraction. Suitable extraction agents can be selected from a solvent, an acid:solvent mixture, and a supercritical fluid. Extraction techniques that can be employed in accordance with the method are discussed above. The quantity of pore-forming agent recovered from the Method of Making a Mesostructure can range from about 60 weight percent to about 80 weight percent, or about 70 weight percent.

At least a portion of the pore-forming agent employed to make the mesostructure remains in the interior of mesostructure material produced according to this method. It is desirable to remove some or all of the pore-forming agent from the mesostructure, for example, to enable reuse of the pore-forming agent when making subsequent mesostructures. Removal of at least a portion of the pore-forming agent from the mesostructure can be accomplished by chemical reaction. Suitable chemical reactions can include chemical extraction, for example, solvent extraction, acid:solvent extraction, supercritical fluid extraction, or any combination of these methods, which are described herein. In one embodiment, at least a portion of the pore-forming agent is acid:solvent extracted from a mesostructure formed in accordance with the method of making a mesostructure described herein. The quantity of pore-forming agent recovered from the mesostructure can range from about 30 weight percent to about 100 weight percent, from about 40 weight percent to about 90 weight percent, from about 50 weight percent to about 80 weight percent, or from about 60 weight percent to about 70 weight percent. When cationic pore forming agents (e.g., cationic surfactants) are used to produce mesostructured zeolites in a basic pH controlled media, the electrostatic attraction between the positively charged pore forming agent and the surface of the mesostructured zeolites, which are negatively charged in a neutral and/or in a basic media favors the incorporation of the pore forming agents inside the zeolite. However, this coulombic attraction makes the recovery of the cationic pore forming agent more difficult than, for example, when a neutral pore forming agent is used. Where the pore forming agent is a cationic pore forming agent and the pH controlled medium is a neutral or a basic medium, acid is used in the recovery step to alter the medium and reduce the coulombic interaction and enable expulsion of the pore forming agent from the interior of the mesostructured zeolite.

Figure 7:
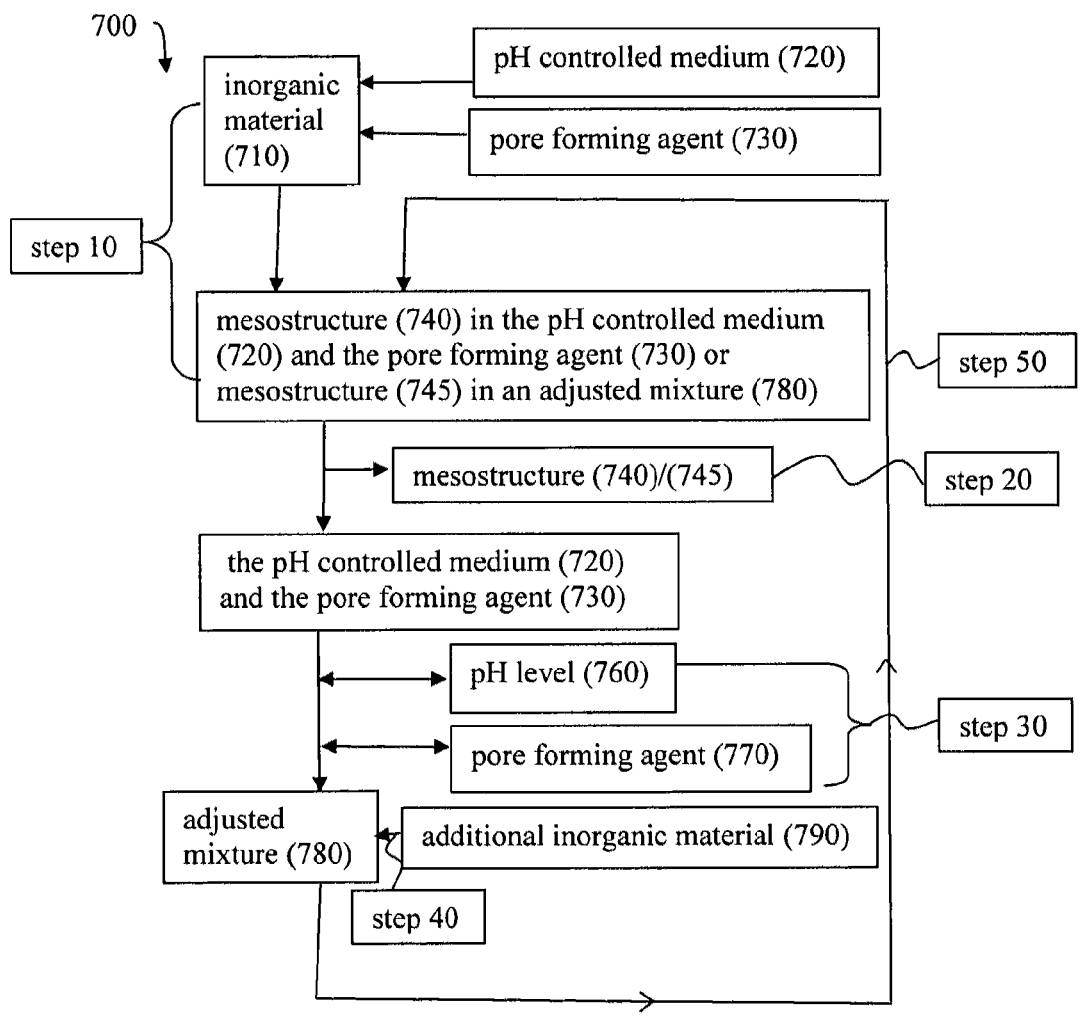
FIG. 7 is a schematic diagram of a method of making multiple mesostructures.

Another aspect provides a method of making multiple mesostructures 700. Referring now to FIG. 7, in accordance with the method, in step 10 an inorganic material having long-range crystallinity 710 (e.g., a zeolite) is exposed to a pH controlled medium 720 and a pore-forming agent 730. The pH controlled medium 720 has a pH value that ranges from about −2 to about 6 and from about 8 to about 14. The pore-forming agent 730 can be a neutral surfactant, an anionic surfactant, a cationic surfactant, an ionic surfactant and/or combinations of these. In step 10, exposure of the inorganic material 710 to the pH controlled medium 720 and the pore-forming agent 730 is controlled under a set of time and temperature conditions sufficient to define, in the inorganic material 710, a plurality of mesopores having a controlled cross sectional area thereby forming a mesostructure having long-range crystallinity 740. The temperature conditions can range from, for example, about room temperature to about 200° C. The time conditions can range from, for example, about 1 hour to about 1 week. The pH of the pH controlled medium 720, the type and quantity of pore-forming agent 730, and the time and the temperature of the exposure can be selected to achieve a desired mesostructure.

In accordance with step 20, the mesostructure 740 is separated from the pH controlled medium 720 and the pore-forming agent 730. In step 30, the pH level 760 and the pore-forming agent 770 quantity of the pH controlled medium 720 and the pore-forming agent 730 is adjusted to provide an adjusted mixture 780. The type of pore-forming agent 770 can be the same or different from the pore-forming agent 730. The quantity of pore-forming agent 770 can be increased or reduced, for example. In one embodiment, the pore-forming agent 770 is adjusted by adding a quantity of a pore-forming agent. In one embodiment, adjusting the pH level 760 includes adding a pH controlling substance. In step 40, an additional inorganic material having long-range crystallinity 790 is exposed to the adjusted mixture 780. Exposure of the additional inorganic material 790 to the adjusted mixture 780 is controlled in step 50 under a second set of time and temperature conditions sufficient to define in the additional inorganic material 790 a plurality of mesopores having a controlled cross sectional area thereby forming a mesostructure 745 having long-range crystallinity (e.g., an additional mesostructure 745 relative to the first mesostructure 740). Optionally, the method further includes repeating steps 20-50 to produce multiple mesostructures 745. In one embodiment, a first mesostructure 740 and a subsequent mesostructure 745 formed according to the described method are substantially the same (e.g., substantially the same mesoporosity, pore structure, and are the same inorganic material). Alternatively, the mesostructure 740 formed in steps 10-20 is different from an additional mesostructure 745 formed in steps 40-50. For example, the pH controlled medium 720 can have a pH that is different from the pH of the adjusted mixture 780. Likewise, the quantity and/or type of pore-forming agent 730 can be different from the quantity and/or type of pore-forming agent 770 present in the adjusted mixture 780. In addition, the inorganic material 710 can be different from the additional inorganic material 790.

In one embodiment, the first set of time and temperature conditions in step 10 is the same as the second set of time and temperature conditions in step 50. Alternatively, the time and temperature conditions in step 10 are different from the second set of conditions employed in step 50. Optionally, in step 10, the inorganic material 710 is simultaneously exposed to the pH controlled medium 720 and the pore-forming agent 730. Alternatively, in step 10 the inorganic material 710 is sequentially exposed to the pH controlled medium 720 and the pore-forming agent 730.

Figure 8:
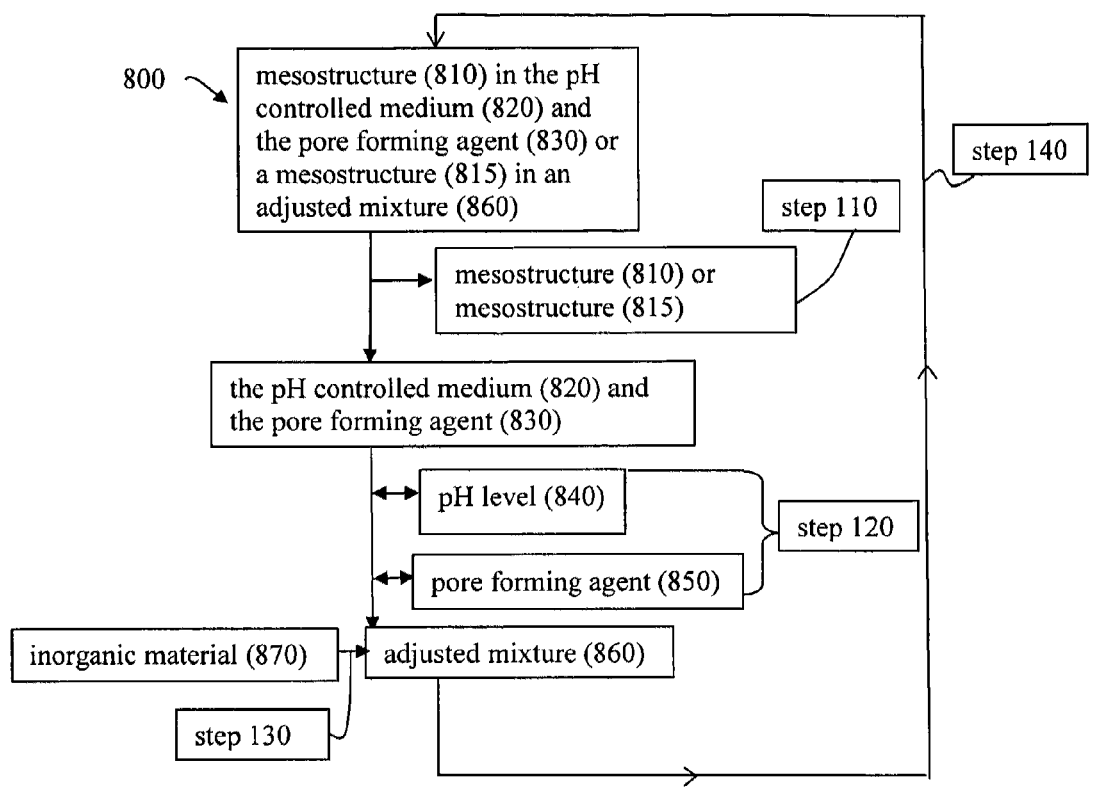
FIG. 8 is a schematic diagram of another method of making multiple mesostructures.

Another aspect, referring now to FIG. 8, provides a method of making multiple mesostructures 800. In accordance with the method, step 110 includes separating a mesostructure 810 having long-range crystallinity and defining a plurality of mesopores having a controlled cross sectional from a pH controlled medium 820 and a pore-forming agent 830. Step 120 includes adjusting a pH level 840 and a pore-forming agent 850 quantity in the pH controlled medium 820 and the pore-forming agent 830 to provide an adjusted mixture 860. In accordance with step 120 adjusting the pH level 840 can include adding a pH controlling substance. Adjusting the pore-forming agent 850 can include adding a quantity of a pore-forming agent. Step 130 includes exposing an inorganic material having long-range crystallinity 870 to the adjusted mixture 860. Exposure of the inorganic material 870 to the adjusted mixture 860 is controlled, in step 140, under a set of time and temperature conditions sufficient to define, in the inorganic material 870, a plurality of mesopores having a controlled cross sectional area forming an additional mesostructure 815 having long-range crystallinity. Steps 110-140 are then repeated one or more times.

The pH level of the pH controlled medium 820 and/or the adjusted mixture 860 can have a pH value that ranges from about −2 to about 6 and from about 8 to about 14. The pore-forming agent 830 and/or the pore-forming agent in the adjusted mixture 860 can be a neutral surfactant, an anionic surfactant, a cationic surfactant, an ionic surfactant and/or combinations of these. The temperature conditions can range from, for example, about room temperature to about 200° C. The time conditions can range from, for example, about 1 hour to about 1 week.

Mesostructures having long-range crystallinity area can be employed in chemical processing operations including, for example, catalytic cracking, fluidized catalytic cracking, hydrogenation, hydrosulfurization, hydrocracking, hydrosisomerization, oligomerization, or alkylation or any of these in combination. Any of these chemical processing operations may be employed to produce, for example, a petrochemical product by reacting a petrochemical feed material with a mesostructure having long-range crystallinity and a controlled cross sectional area and/or a controlled pore size distribution.

EXAMPLE 1

First, 8 grams of NaOH is dissolved in 1 liter of water to create a pH controlled medium (i.e., a basic medium). Thereafter, 160 grams of the pore-forming agent cetyltrimethylammonium bromide (CTAB) is dissolved in the pH controlled medium. 160 grams of the zeolite USY is exposed to the pH controlled medium and the pore-forming agent. The zeolite USY has long-range crystallinity. Exposure of the zeolite USY to the basic medium and the CTAB is controlled at a temperature of about 120° C. for about two days (i.e., 48 hours) to define, in the zeolite USY, a plurality of mesopores having a controlled cross sectional area to form a mesostructure having long-range crystallinity. At least a portion of the pore-forming agent, CTAB, remains in the mesostructured zeolite formed according to this method.

Figure 9:
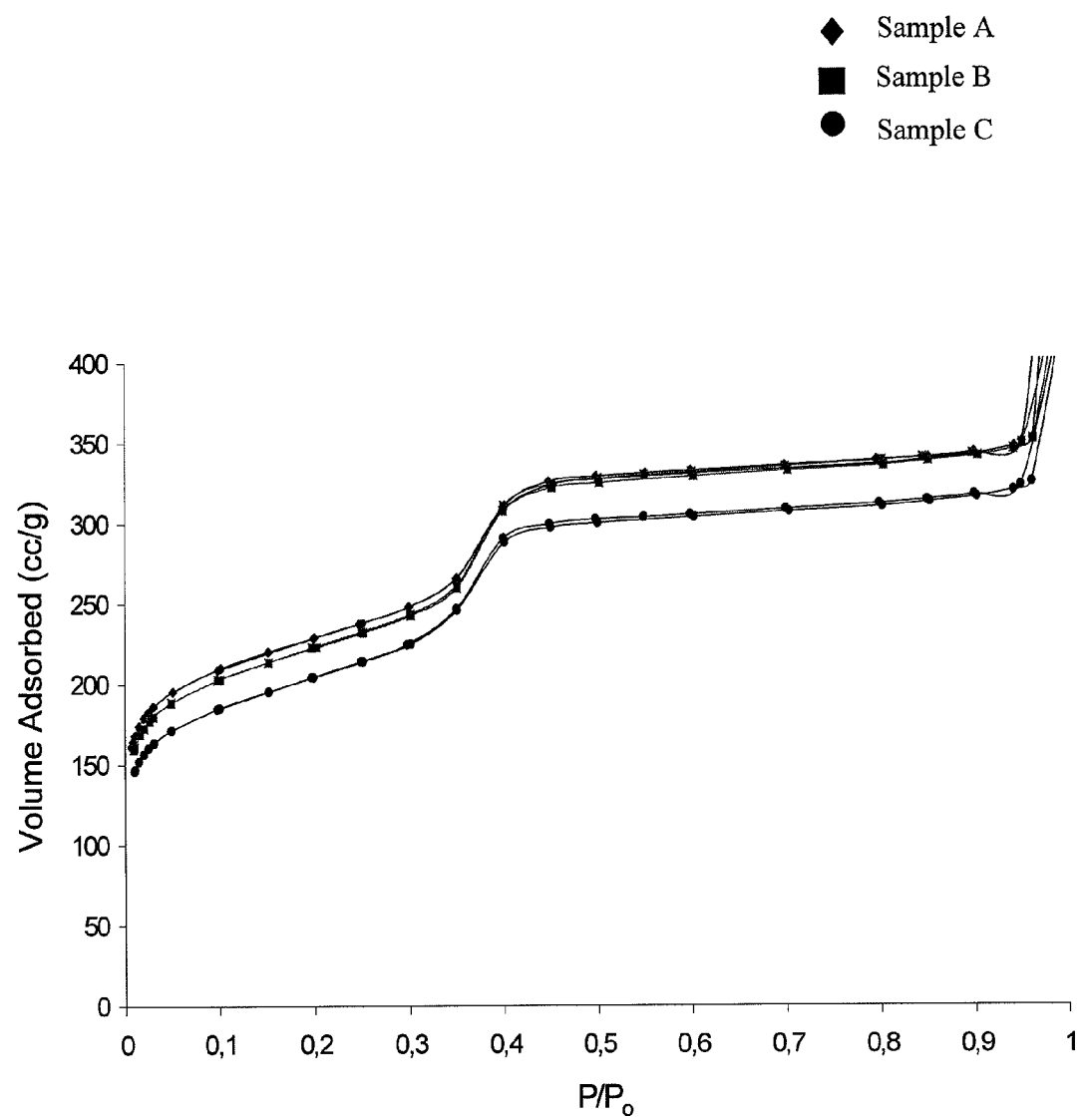
FIG. 9 depicts the nitrogen adsorption isotherm at 77 K of three samples of mesostructured zeolite having long-range crystallinity where each sample, sample A, sample B, and sample C, was exposed to various processes that remove at least a portion of the pore-forming agent, a surfactant, from the mesostructured zeolite.

The mesostructured zeolite was exposed to a variety of processes that remove at least a portion of the pore-forming agent, i.e., the surfactant CTAB, from the mesostructured zeolite. FIG. 9 depicts the nitrogen adsorption isotherm at 77 K of mesostructured zeolite after exposure to one or more processes that remove at least a portion of CTAB, these samples are labeled sample A, sample B, and sample C. The processes by which sample A, sample B, and sample C were treated is detailed below.

A portion of mesostructured zeolite formed according to the method was calcined. During calcination the mesostructured zeolite is heated to a temperature below its melting point and this enables thermal decomposition of the pore-forming agent CTAB that remains in the mesostructure. More specifically, in sample A 1 gram of the mesostructured zeolite was heat treated at 550° C. in nitrogen for 4 hours while employing a calcination temperature ramp of 5° C./min. Thereafter, the sample A of the mesostructured zeolite was heat treated at 550° C. in synthetic air for 8 hours to remove the CTAB. Virtually all of the CTAB was removed under these conditions.

In sample B, 1 g of mesostructured zeolite was exposed to 250 ml of a 10:1 acetone:HCl (37 wt %) for 2 hours under reflux conditions whereby mesostructured zeolite suspended in the extraction solution was boiled in a round flask attached to a condenser such that the vapors continuously condense for reboiling. Sample B of the mesostructured zeolite was filtered out via vacuum filtration with a medium-pore size filter paper. Deionized water was employed to get a neutral or almost neutral filtrate. Sample B of the mesostructured zeolite was thereafter thoroughly washed by deionised water. As shown in FIG. 9, virtually all the CTAB is removed/recovered from sample B.

In sample C, 1 g of mesostructured zeolite was exposed 250 ml of a 10:1 ethanol:HCl (37 wt %) for 2 hours under reflux conditions whereby the mesostructured zeolite suspended in the extraction solution was boiled in a round flask attached to a condenser such that the vapors continuously condense for reboiling. Sample C of the mesostructured zeolite was filtered out via vacuum filtration with a medium pore-sized filter paper. Deionized water was employed to get a neutral or almost neutral filtrate. Sample C of the mesostructured zeolite was thereafter thoroughly washed by deionised water. As shown in FIG. 9, in sample C about 90% of the CTAB was removed from the mesostructured zeolite. The total nitrogen adsorbed by Sample A (is CTAB free by calcination) is 340 cc/g and the total nitrogen adsorbed by sample C is 310 cc/g. Sample C therefore has 91% CTAB recovery (e.g., (310 cc/g)/(340 cc/g)*100=91%).

FIG. 9 depicts the nitrogen adsorption isotherm at 77 K of mesostructured zeolite having long-range crystallinity after exposure to one or more processes that remove at least a portion of CTAB, these samples are sample A, sample B, and sample C. The presence of well-defined mesoporosity in mesostructured zeolite can be suitably studied by nitrogen adsorption. The presence of well developed narrow pore size diameter distribution mesoporosity is evident in each of sample A, sample B, and sample C. Each mesostructured zeolite sample shows sharp nitrogen uptake of the volume adsorbed at higher partial pressures ($P/P_0$~0.3-0.4). The presence of well developed narrow pore size mesoporosity in each of the mesostructured zeolites is evident by the sharp nitrogen uptake at about $P/P_0$~0.3.

Sample A and sample B show substantially the same isotherm. The mesostructured zeolite in sample B, which was exposed to acid:solvent extraction employing Acetone:HCl and calcination, has substantially the same mesoporosity as the mesostructured zeolite in sample A, which was only exposed to calcination. Thus, the exposure to acid:solvent extraction of pore-forming agent CTAB from the mesostructured zeolite provides a mesostructured zeolite that is substantially the same as a mesostructured zeolite that has been exposed only to calcination. This extraction method allows for recovering almost all of the CTAB.

Sample C shows a nitrogen uptake at higher partial pressures ($P/P_0$~0.3-0.4) that is also present in sample A, and sample B. However, sample C has a lower mesopore volume relative to sample A and to sample B, as indicated by the lower volume adsorbed relative to sample A and sample B. It appears that ethanol in the 10:1 ethanol:HCl (37 wt %) (used in the sample C) is a less effective solvent then the 10:1 acetone:HCl (37 wt %) (used in the sample B).

The CTAB recovered from sample B was reused in a new preparation of a mesostructured zeolite. The mesostructured zeolite obtained using the recovered CTAB was equivalent to mesostructured zeolites produced with fresh CTAB.

EXAMPLE 2

First, 300 ml $NH_4OH$ (30 wt %) is dissolved in 1 liter of water to create a pH controlled medium. Thereafter, 80 g of the pore-forming agent cetyltrimethylammonium bromide (CTAB) is dissolved in the pH controlled medium. 80 grams of the zeolite USY is exposed to the pH controlled medium and the pore-forming agent. The zeolite USY has long-range crystallinity. The exposure of the zeolite USY to the basic medium and the CTAB is controlled at a temperature of about 120° C. for about two days (e.g., 48 hours) to define in the zeolite USY a plurality of mesopores having a controlled cross sectional area to form a mesostructure having long-range crystallinity. The mesostructured zeolite formed according to this method is filtered out of the mixture of pH controlled medium and CTAB. The mixture of pH controlled medium and CTAB is distilled via evaporation on a heated surface to recover a portion of the ammonia and a portion of the CTAB. By this method, almost all of the CTAB left in the filtrate is recovered. Some of the ammonia is lost during the evaporation process.

At least a portion of the pore-forming agent CTAB is removed from the mesostructured zeolite by acid:solvent extraction. Specifically, the mesostructured zeolite is exposed to an acid:solvent extraction medium of 1 liter of 50:1 methanol:$H_2SO_4$ (96 wt %) solution. The mesostructured zeolite is stirred in the acid:solvent extraction medium at 70° C. in a sealed vessel for 2 hours. The mesostructured zeolite is then filtered out from the acid:solvent extraction medium.

The acid:solvent extraction medium is neutralized via acid neutralization. Specifically, the acid:solvent extraction medium is exposed to 50 grams of calcium carbonate and is stirred for 2 hours at room temperature. As a result of the acid neutralization, acid anion precipitates out of the solution as a solid (calcium sulphate), is filtered, and disposed. The remaining filtrate, in liquid form, is evaporated on a heated surface to recover a solid including CTAB. Virtually all of the CTAB present in the filtrate except the CTAB inside of the mesostructutred zeolite can be recovered in this way. The recovered CTAB is saved for use in preparing additional mesostructures. Virtually all of the CTAB present in the filtrate except the CTAB remaining inside of the mesostructuted zeolite can be recovered by solvent extraction.

The mesostructured zeolite is dried and then calcined to remove any traces of CTAB still present. During calcination the mesostructured zeolite is heated to a temperature below its melting point to enable thermal decomposition of the pore-forming agent CTAB that remains in the mesostructure. More specifically, the mesostructure is heat treated at 550° C. in nitrogen for 4 hours while employing a calcination temperature ramp of 5° C./min. Thereafter the mesostructure is heat treated at 550° C. in synthetic air for 8 hours.

INCORPORATION BY REFERENCE

All publications, patents, and patent applications cited herein are hereby expressly incorporated by reference in their entirety and for all purposes to the same extent as if each was so individually denoted.

EQUIVALENTS

While the invention has been particularly shown and described with reference to specific embodiments, it should be understood by those skilled in the art that various changes in form and detail may be made therein without departing from the spirit and scope of the invention. Variations, modifications, and other implementations of what is described herein will occur to those of ordinary skill without departing from the spirit and the scope of the invention. Those skilled in the art will recognize, or be able to ascertain using no more than routine experimentation, many equivalents to the specific embodiments of the invention described herein. Such equivalents are intended to be encompassed by the following claims. Accordingly, the invention is not to be defined only by the preceding illustrative description.

What is claimed is:

1. A method of recovering a pore-forming agent from a mesostructure, comprising:
   (a) contacting a mesostructure having long-range crystallinity with an extraction agent under conditions of time and temperature sufficient to extract at least a portion of a pore-forming agent from said mesostructure, wherein said mesostructure comprises an inorganic material defining a plurality of mesopores having a controlled cross sectional area, and wherein said extraction agent is an acid:solvent mixture, wherein:
      said acid of said acid:solvent mixture is selected from the group consisting of hydrochloric acid, nitric acid, sulphuric acid, a sulphonic acid, a carboxylic acid, a halogenated acid, and mixtures of two or more thereof, and
      said solvent of said acid:solvent mixture is selected from the group consisting of an alcohol, acetone, dimethylformamide, methylpyrrolidone, a halogenated solvent, acetonitrile, and mixtures of two or more thereof;
   (b) at least partially neutralizing the acid employed in said acid:solvent extraction with an acid neutralizing agent;
   (c) separating said extraction agent containing at least a portion of said pore-foiming agent from said mesostructure;
   (d) separating at least a portion of said pore-forming agent from said extraction agent; and
   (e) reusing said pore-forming agent to form a mesostructure having long-range crystallinity.

2. The method of claim 1, further comprising after step (c) calcinating said mesostructure to remove any quantity of said pore-forming agent remaining in said mesopores.

3. The method of claim 1, wherein step (c) is performed at a temperature ranging from about room temperature to about the boiling point of said solvent in said acid:solvent mixture, wherein step (c) comprises reflux extraction.

4. The method of claim 1, wherein step (d) is performed via distillation.

5. The method of claim 1, wherein step (d) comprises one or more methods selected from the group consisting of distillation, precipitation, filtration, and chemical reaction.

6. The method of claim 1, further comprising performing steps (c) at least twice.

7. The method of claim 1, wherein said method of recovering a pore-forming agent is sufficient to remove in the range of from about 65 to about 100 weight percent of said pore-forming agent from said mesostructure.

8. The method of claim 1, wherein said mesostructure having long-range crystallinity comprises a zeolite.

9. The method of claim 1, wherein said pore-forming agent comprises a surfactant.

10. The method of claim 1, wherein said mesostructure is prepared by exposing an inorganic material having long-range crystallinity to a pH controlled medium and said pore-forming agent.

11. The method of claim 10, wherein said pH controlled medium has a pH in the range of from about 8 to about 14.

12. A method of recovering a pore-forming agent from a mesostructure, comprising:
   (a) contacting a mesostructure having long-range crystallinity with an extraction agent under conditions of time and temperature sufficient to extract at least a portion of a pore-forming agent from said mesostructure, wherein said extraction agent comprises an acid:solvent mixture, and wherein said mesostructure comprises an inorganic material defining a plurality of mesopores having a controlled cross sectional area,
   (b) at least partially neutralizing the acid employed in the acid:solvent extraction with an acid neutralizing agent,
   (c) separating said extraction agent containing at least a portion of said pore-forming agent from said mesostructure;
   (d) separating at least a portion of said pore-forming agent from said extraction agent; and
   (e) reusing said pore-forming agent to form a mesostructure having long-range crystallinity.

13. The method of claim 12, wherein said acid of said acid:solvent mixture is selected from the group consisting of hydrochloric acid, nitric acid, sulphuric acid, a sulphonic acid, a carboxylic acid, a halogenated acid, and mixtures of two or more thereof.

14. The method of claim 12, wherein said solvent of said acid:solvent mixture is selected from the group consisting of an alcohol, acetone, dimethylformamide, methylpyrrolidone, a halogenated solvent, acetonitrile, and mixtures of two or more thereof.

15. The method of claim 12, wherein step (c) is performed at a temperature ranging from about room temperature to about the boiling point of said solvent in said acid:solvent mixture.

16. The method of claim 12, wherein step (c) comprises reflux extraction.

17. The method of claim 12, wherein step (d) is performed via distillation.

18. The method of claim 12, wherein said method of recovering a pore-forming agent is sufficient to remove in the range of from about 65 to about 100 weight percent of said pore-forming agent from said mesostructure.

19. The method of claim 12, further comprising after step (c) calcinating said mesostructure to remove any quantity of said pore-forming agent remaining in said mesopores.

20. The method of claim 12, wherein said mesostructure having long-range crystallinity comprises a zeolite.

21. The method of claim 12, wherein said pore-forming agent comprises a surfactant.

22. The method of claim 12, wherein said mesostructure is prepared by exposing an inorganic material having long-range crystallinity to a pH controlled medium and said pore-forming agent.

23. The method of claim 22, wherein said pH controlled medium has a pH in the range of from about 8 to about 14.

* * * * *